(12) United States Patent
Ado et al.

(10) Patent No.: US 6,216,201 B1
(45) Date of Patent: *Apr. 10, 2001

(54) DATA PROCESSING APPARATUS USING PAGED BUFFER MEMORY FOR EFFICIENTLY PROCESSING DATA OF A COMPACT DIGITAL DISK

(75) Inventors: Keitaro Ado, Hyogo; Isamu Moriwaki, Osaka, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/907,303

(22) Filed: Aug. 6, 1997

(30) Foreign Application Priority Data

Aug. 8, 1996 (JP) .................................................. 8-209685
May 12, 1997 (JP) .................................................. 9-121243

(51) Int. Cl.[7] ..................................................... G06F 12/08
(52) U.S. Cl. .............................. 711/112; 711/209; 710/56
(58) Field of Search .......................... 711/111, 112, 113, 711/203, 209; 710/52, 53, 56; 369/32, 33, 47, 48

(56) References Cited

U.S. PATENT DOCUMENTS

| Re. 33,462 |   | 11/1990 | Suzuki et al. ........................ 371/37.5 |
| 5,404,511 | * | 4/1995 | Notarianni ............................... 707/1 |
| 5,499,252 | * | 3/1996 | Watanabe ............................... 369/32 |
| 5,661,848 | * | 8/1997 | Bonke et al. ......................... 711/112 |
| 5,664,224 | * | 9/1997 | Davis ..................................... 710/22 |
| 5,675,559 | * | 10/1997 | Maeda et al. .......................... 369/32 |
| 5,732,050 | * | 3/1998 | Horie ..................................... 369/32 |

FOREIGN PATENT DOCUMENTS 7192462    7/1995   (JP) .............................. G11C/11/406

OTHER PUBLICATIONS

Patterson and Hennessy, "Computer Organization and Design The Hardware/Software Interface", Morgan Kaufmann Publishers, Inc., pp. 481–486, 1994.*

* cited by examiner

Primary Examiner—Do Hyun Yoo
Assistant Examiner—Gary J. Portka
(74) Attorney, Agent, or Firm—Cooper & Dunham LLP

(57) ABSTRACT

A data processing apparatus of an optical disk drive includes a buffer memory which has a page area divided into a plurality of pages, each page having a predetermined size and containing a main data, a subcode and an error code within the page, each page corresponding to one sector of digital data produced by the disk drive with respect to a compact digital disk, an address of each page of the buffer memory being specified by a page number. A buffer management unit accesses data of a particular page of the buffer memory in response to an input address, the input address specifying a starting address of the data of the particular page of the buffer memory. A system control unit having a page register generates the input address by combining a page number stored by the page register with a predetermined offset, and supplies the input address to the buffer management unit when the data of the buffer memory is accessed, the offset being determined in accordance with the data to be accessed, the page number specifying a starting address of the particular page of the buffer memory, the offset specifying a location of the data to be accessed in the particular page relative to the starting address.

14 Claims, 15 Drawing Sheets

BUFFER MEMORY AREAS

DATA PROCESSING APPARATUS USING PAGED BUFFER MEMORY FOR EFFICIENTLY PROCESSING DATA OF A COMPACT DIGITAL DISK

BACKGROUND OF THE INVENTION (1) Field of the Invention

The present invention relates to a data processing apparatus of a compact digital disk drive in which digital data is read from or written to a compact digital disk on a sector-unit basis, the digital data being temporarily stored in a buffer memory. The data processing apparatus of the present invention is applicable to various types of compact digital disk drives such as CD-ROM (compact disk-read only memory) disk drive, CD-R (compact disk-recordable) disk drive and CD-RW (compact disk-rewritable) disk drive.

(2) Description of the Related Art

FIG. 1 shows a compact disk drive in which a data processing apparatus is included. In the compact disk drive of FIG. 1, not only a decoding process which reads data from a compact disk (CD) 10 and produces a sequence of serial digital data from the read data, but also an encoding process which performs an encoding of data output from a host computer and produces a sequence of serial digital data to be written to the CD 10 is performed.

As shown in FIG. 1, the compact disk drive includes a reading unit 11 which reads out data from the CD 10 and outputs an analog signal indicating the read data. A CD decoding unit 13 performs the EFM (eight-to-fourteen modulation) demodulation of the signal from the reading unit 11 so that a sequence of serial digital data is produced from the read data. A data processing unit 15 performs the data processing of the sequence of serial digital data from the CD decoding unit 13 and outputs the processed data. The processed data from the data processing unit 15 is transferred to a host computer 19 via an external interface such as a SCSI interface or an ATAPI interface. The processed data from the data processing unit 15 is temporarily stored in a buffer memory 17 such as a RAM (random access memory).

Further, in the compact disk drive of FIG. 1, the data processing unit 15 performs the data processing of data output from the host computer 19 via the external interface. For example, the data processing is performed to carry out an encoding of the data from the host computer 19. The data to be processed by the data processing unit 15 is temporarily stored in the buffer memory 17. A CD encoding unit 14 performs the encoding of the data output by the host computer 19 through the data processing unit 15, performs the EFM modulation of the coded data, and outputs a sequence of the modulated signal. A writing unit 12 writes the modulated signal at the output of the CD encoding unit 14 to the CD 10.

FIG. 2 shows a flow of data processing which is performed by the compact disk drive during the decoding process.

In FIG. 2, a decimal number in parentheses attached to a name of each field denotes the number of bytes indicating the length of data included in the field.

The compact disk drive performs the reading of data from the CD 10 on a frame-unit basis. In FIG. 2, (a) shows a format of one frame of record data obtained after the EFM demodulation of the read data from the CD 10. As shown, the frame 21 contains a subcode (1 byte), a first main data (12 bytes) followed by parity bits (4 bytes), and a second main data (12 bytes) followed by parity bits (4 bytes). The main data includes digital stereophonic musical signals. The subcode includes time signal bits and pause signal bits. The parity bits are used for an error correction decoding.

In FIG. 2, (b) shows a subcode 22 (1 byte) and a main data 23 (24 bytes) which are included within one frame (or the frame 21). The main data 23 is obtained after the error correction decoding is performed with the parity bits and the first main data and the second main data are combined.

The subcodes which are collected from 98 frames and have 96 bytes of data form a part of one subcode frame. The sequence of the main data which are collected from 98 frames and include 98 main data items, each having 2352 bytes of data, constitute one main data block. In FIG. 2, (c) shows a format of one block of the record data including a subcode block 24 and a main data block 25. As shown, the subcode block 24 includes a sync pattern (2 bytes) and a subcode (96 bytes). The sync pattern is used for detecting the starting point of the subcode block in the record data. The main data block 25 includes 2353 bytes of the main data 23 from the 98 frames.

There are two major formats of record data obtained by reading of the compact digital disks: the CD-DA format and the CD-ROM format. The CD-DA format is used for the reproducing and recording of musical signals. The CD-ROM format is used for the reproducing and recording of digital data signals. A determination as to whether the read data is in the CD-DA format or in the CD-ROM format is made by referencing a specific control bit included in the subcode.

In a case in which the read data is in the CD-DA format (or the musical signals), the CD decoding unit 13 produces the sequence of digital data in the format indicated by (c) in FIG. 2. On the other hand, in a case in which the read data is in the CD-ROM format (or the digital data signals), a higher level of reliability of the reproduced data is required. In the latter case, the data processing unit 15 performs error correction decoding of the digital data at the output of the CD decoding unit 13 for this purpose. In the case of the CD-ROM format, one block of the record data is treated as one sector.

In FIG. 2, (d) shows a mode-1 CD-ROM format of one sector (or one block) of the record data produced by the data processing unit 15. As shown, the main data block 27 of the CD-ROM format contains a sync pattern (12 bytes), a header (4 bytes), a user data (2048 bytes), an error detection code (EDC) (4 bytes), a set of zero bits (8 bytes), and an error correction code (ECC) (276 bytes).

In FIG. 2, (e) shows a user data 29 which is obtained from the main data block 27 at the output of the data processing unit 15 and sent to the host computer 19. As described above, the read data at the output of the reading unit 11 is supplied to the CD decoding unit 13. The CD decoding unit 13 performs the data processing in accordance with the flow indicated by (a) through (c) in FIG. 2. After this, the data processing unit 15 performs the data processing in accordance with the format indicated by (d) in FIG. 2. The user data at the output of the data processing unit 15 is sent to the host computer 19 via the external interface as indicated by (e) in FIG. 2. In the data processing unit 15, the correlation between the memory areas of the buffer memory 17 and the various fields of the record data including the user data, the subcodes and the error codes is defined, and management of the record data using the correlation is carried out.

FIG. 3 shows a method of management of record data in buffer memory areas used by a conventional data processing apparatus. As shown in FIG. 3, in the conventional data processing apparatus, the memory areas of the buffer memory are divided into a user data area, an error code area and a subcode area. In the user data area, "n" data items including the user data#1 through the user data#n are sequentially arranged. In the error code area, "n" data items including the error code#1 through the error code#n are sequentially arranged. In the subcode area, "n" data items including the subcode#1 through the subcode#n are sequentially arranged.

In the method of data management of FIG. 3, the address (or the memory location) of the buffer memory 17 for the data item to be processed by the conventional data processing apparatus must be computed from the base address (or the starting address) of the related memory area and the offset of the data item in the related memory area in the respective steps of the data processing during the reading of data from the disk or during the writing of data to the disk. That is, it is necessary that both the starting address and the offset be set in a register and the addition of the starting address and the offset be executed by using an adder, in order to determine the address of the buffer memory 17 for the data item to be processed. The register and the adder require a size capacity to hold all the bits of the address to be determined. Further, the method of the data management of FIG. 3 requires a look-up table which defines the relationship between the memory areas of the buffer memory 17 and the various fields of the record data including the user data, the subcodes and the error codes for the respective sectors. The handling of the register and the adder using the look-up table is a complicated task.

In recent years, high speed data processing of compact digital disk drives such as CD-ROM disk drive, CD-R drive and CD-RW disk drive is increasingly demanded. However, it is difficult for the conventional data processing apparatus to satisfy the demand for increasing the data processing speed.

SUMMARY OF THE INVENTION

An object of the present invention is to provide an improved data processing apparatus in which the above-described problems are eliminated.

Another object of the present invention is to provide a data processing apparatus which efficiently processes data of a compact digital disk such as CD-ROM and provides an increased data processing speed.

The above-mentioned objects of the present invention are achieved by a data processing apparatus of a compact digital disk drive in which digital data is read from or written to a compact digital disk on a sector-unit basis, the digital data being temporarily stored in a buffer memory, the data processing apparatus comprising: a buffer memory having a page area which is divided into a plurality of pages, each of the plurality of pages having a predetermined size and containing a main data, a subcode and an error code within the page, each page corresponding to one sector of digital data produced by the compact digital disk drive with respect to the compact digital disk, an address of each page of the buffer memory being specified by a page number; a buffer management unit which accesses data of a particular page of the buffer memory in response to an input address, the input address specifying a starting address of the data of the particular page of the buffer memory; and a system control unit, having a page register, which generates the input address by combining a page number stored by the page register with a predetermined offset, and supplies the input address to the buffer management unit when the data of the buffer memory is accessed, the offset being determined in accordance with the data to be accessed, the page number specifying a starting address of the particular page of the buffer memory, the offset specifying a location of the data to be accessed in the particular page relative to the starting address.

In the data processing apparatus of the present invention, the memory areas of the buffer memory are divided into the plurality of pages, each having the predetermined size and containing the user data, the subcode and the error code. The input address used to access the data of the buffer memory is specified by combining the page number stored by the page register with the offset determined by the relevant processing unit in accordance with the data to be accessed. The high-order bits of the input address are determined by the page number, and the low-order bits of the input address are determined by the offset. The input address to the buffer management unit can be easily generated by the relevant processing unit with a simple circuit, and the generation of the address does not require an arithmetic operation such as addition or multiplication. Therefore, the data processing apparatus of the present invention efficiently processes data of the compact digital disk and provides an increased data processing speed.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENTS

A description will now be given of the preferred embodiments of the present invention with reference to the accompanying drawings.

Figure 1:
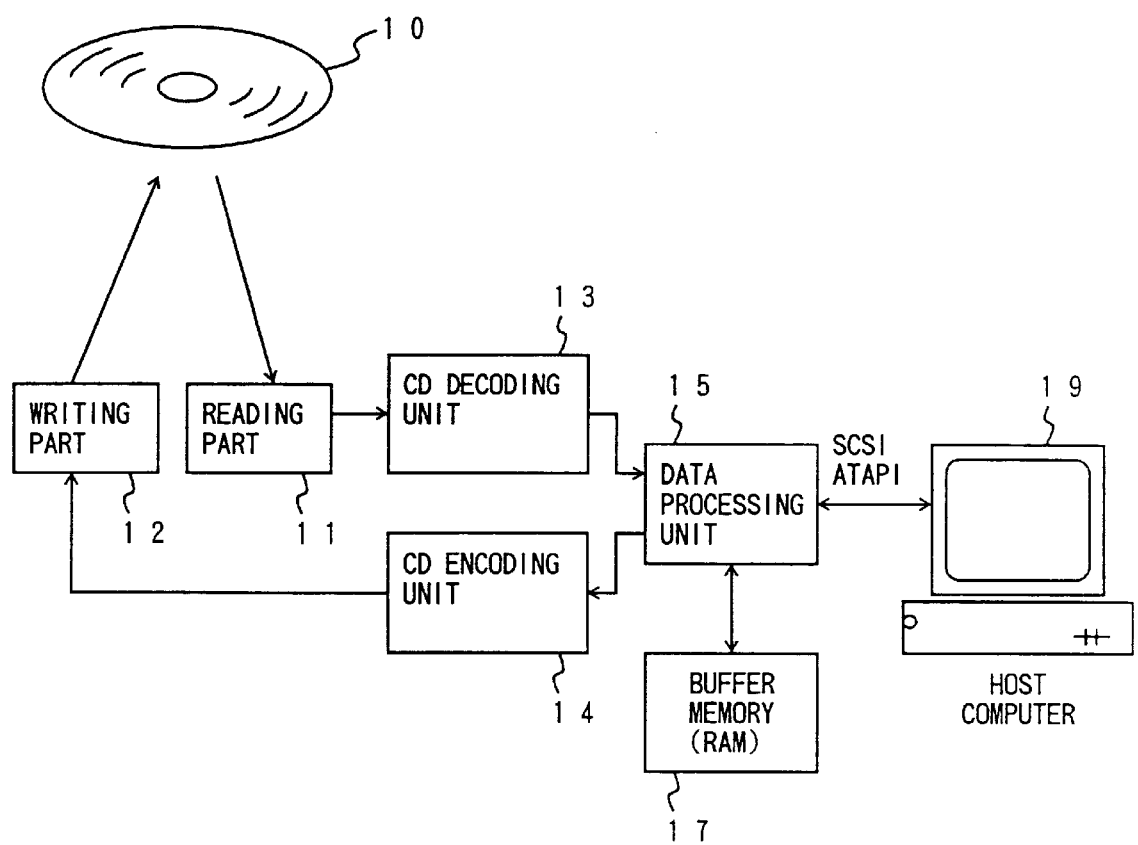
FIG. 1 is a block diagram of a compact disk drive in which a data processing apparatus is included.

In the following description with reference to FIGS. 4 through 19, the elements which are the same as corresponding elements in FIG. 1 are designated by the same reference numerals, and a description thereof will be omitted.

Figure 4:
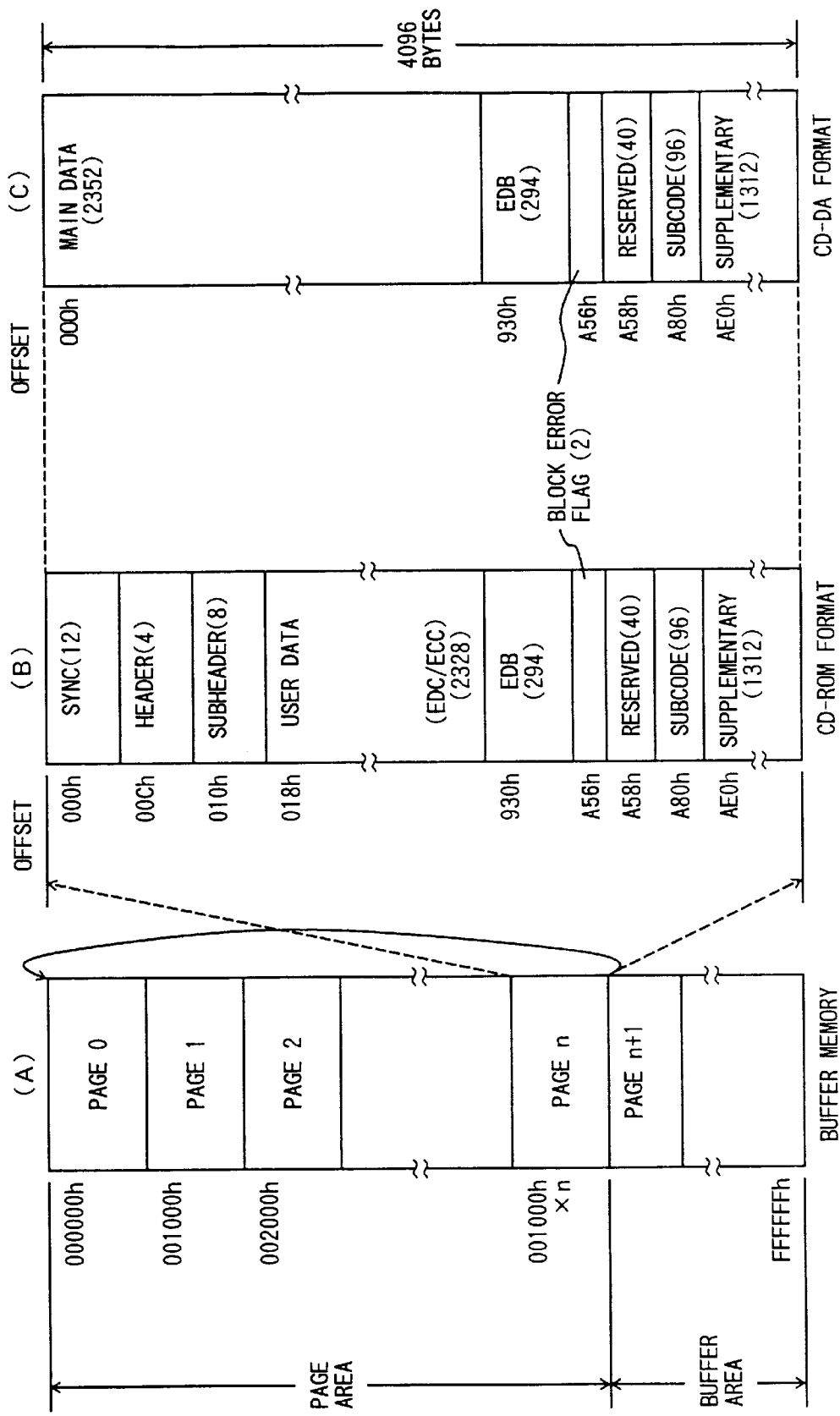
FIG. 4 is a diagram for explaining an arrangement of data stored in a buffer memory of a data processing apparatus of the present invention.

FIG. 4 shows an arrangement of data stored in a buffer memory (RAM) 17 of a compact digital disk drive including the data processing apparatus of the present invention. In FIG. 4, (A) indicates a format of data stored in memory areas of the buffer memory (RAM) 17.

As indicated by (A) in FIG. 4, the memory areas of the buffer memory 17 are divided into a page area and a buffer area. The page area is divided into "n+1" pages which include page 0, page 1, . . . , page n. Each of the pages in the page area has a size of 4096 bytes of digital data. A specific page of the pages in the page area of the buffer memory 17 is identified by a page number which will be described later. The buffer area of the buffer memory 17 is also divided in a similar manner.

Figure 2:
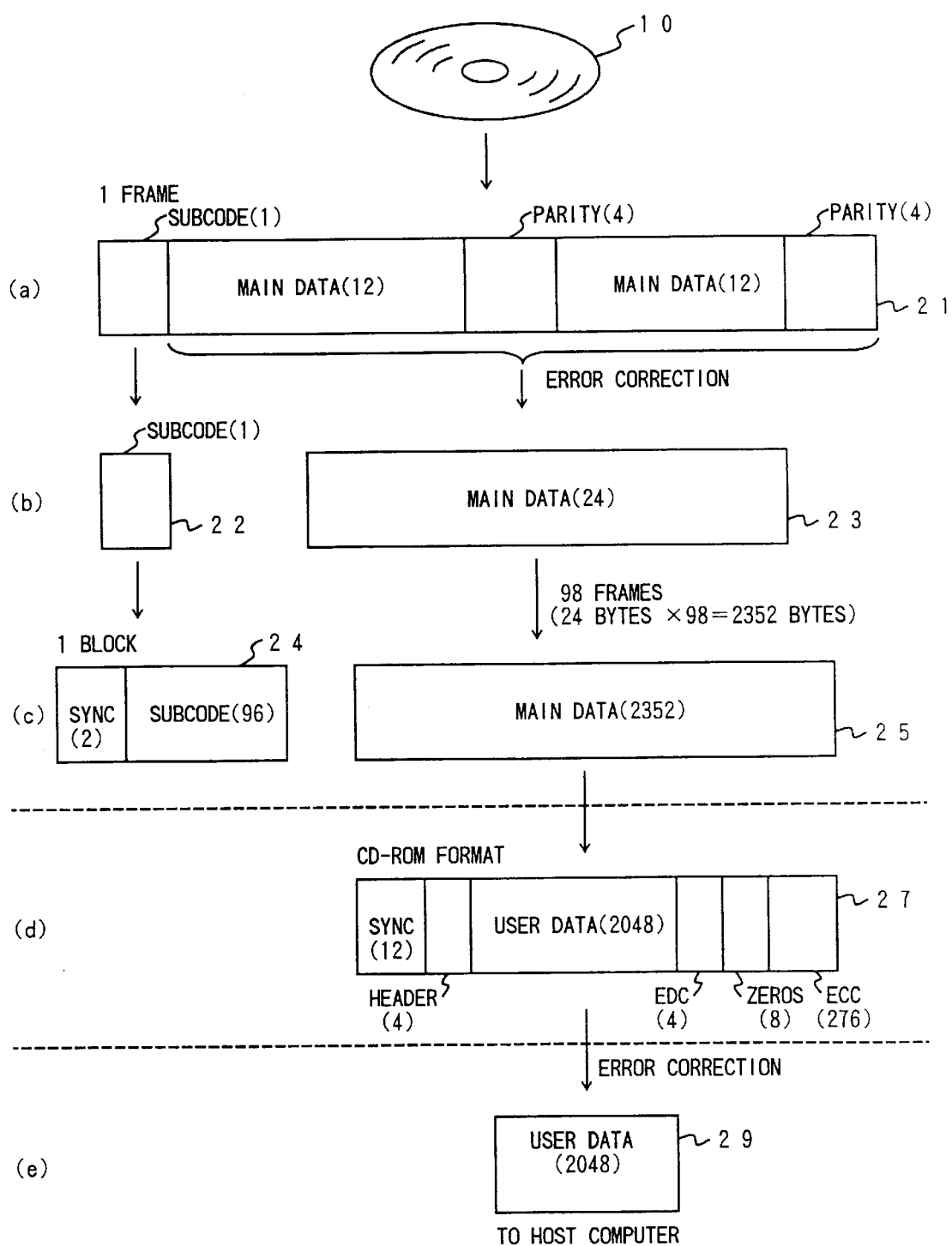
FIG. 2 is a diagram for explaining a flow of data processing which is performed in the compact disk drive.
Figure 3:
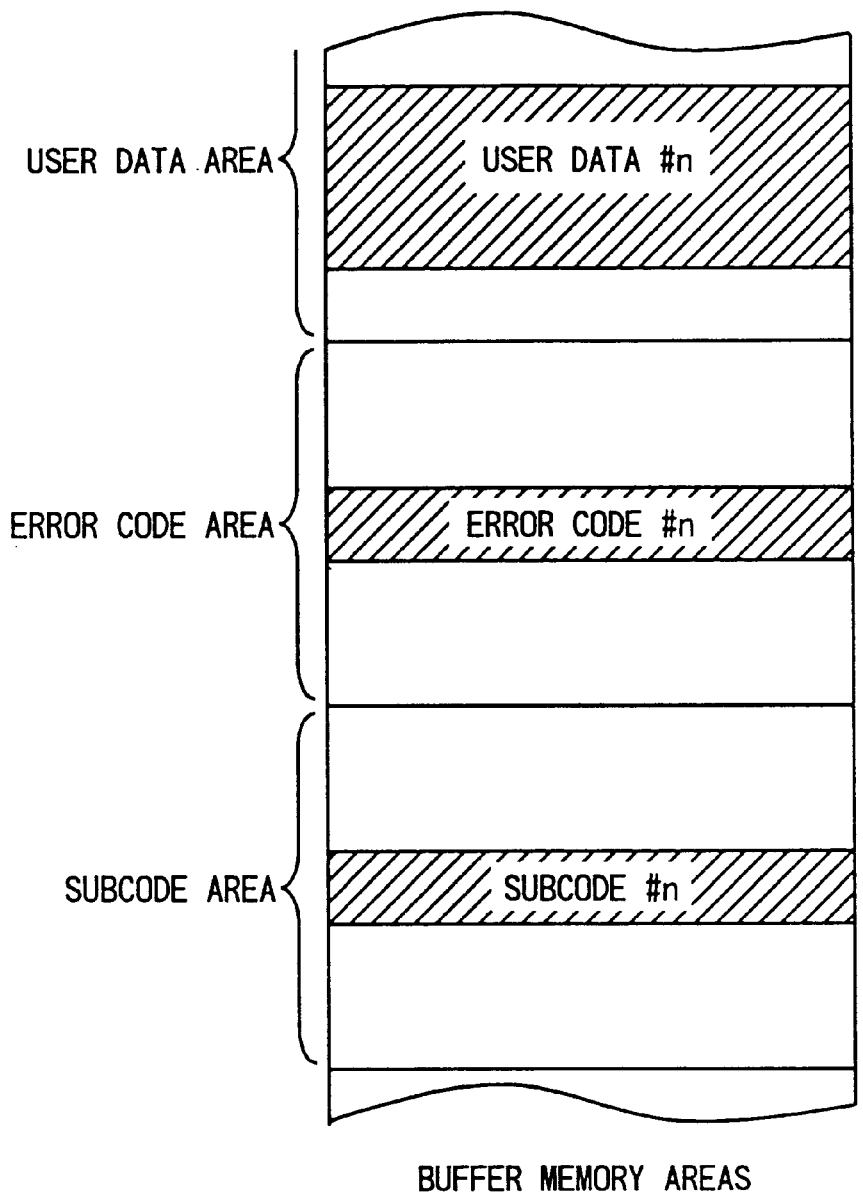
FIG. 3 is a diagram for explaining a method of management of record data in buffer memory areas used by a conventional data processing apparatus.

In the buffer memory 17 of the compact digital disk drive, 4096 bytes of digital data, which corresponds to one block (or one sector) of data output from the CD decoding unit 13, is stored in one page of the page area of the buffer memory 17. Thus, the user data, the subcodes and the error codes, which are included in one sector of the digital data (in the format indicated by (c) or (d) in FIG. 2) at the output of the CD decoding unit 13, are arranged within one page of the page area of the buffer memory 17.

In FIG. 4, (B) indicates a format of digital data of one page of the buffer memory 17 which is arranged in conformity with the CD-ROM format, and (C) indicates a format of digital data of one page of the buffer memory 17 which is arranged in conformity with the CD-DA format.

As indicated by (C) in FIG. 4, in the case of the CD-DA format, one page contains a main data field (2353 bytes), an EDB field (294 bytes), a block error flag field (2 bytes), a reserved field (40 bytes), a subcode field (96 bytes), and a supplementary field (1312 bytes). The EDB field contains error-detection-byte (EDB) data obtained after the error correction of one frame at the output of the CD decoding unit 13 is performed. The block error flag field contains a block error flag determined based on the value of the EDB data.

As indicated by (B) in FIG. 4, in the case of the CD-ROM format, the main data field of the CD-DA format is further divided into various fields. One page of the CD-ROM format contains a sync pattern field (12 bytes), a header field (4 bytes), a subheader field (8 bytes), and a user data field (2328 bytes). Other fields of the CD-ROM format are the same as those of the CD-DA format.

In the following description, the data processing apparatus using the buffer memory in which the digital data is arranged in the CD-DA format indicated by (C) in FIG. 4 will be explained in detail. However, it is a matter of course that the data processing apparatus of the present invention may use the buffer memory in which the digital data is arranged in the CD-ROM format indicated by (B) in FIG. 4.

Figure 5:
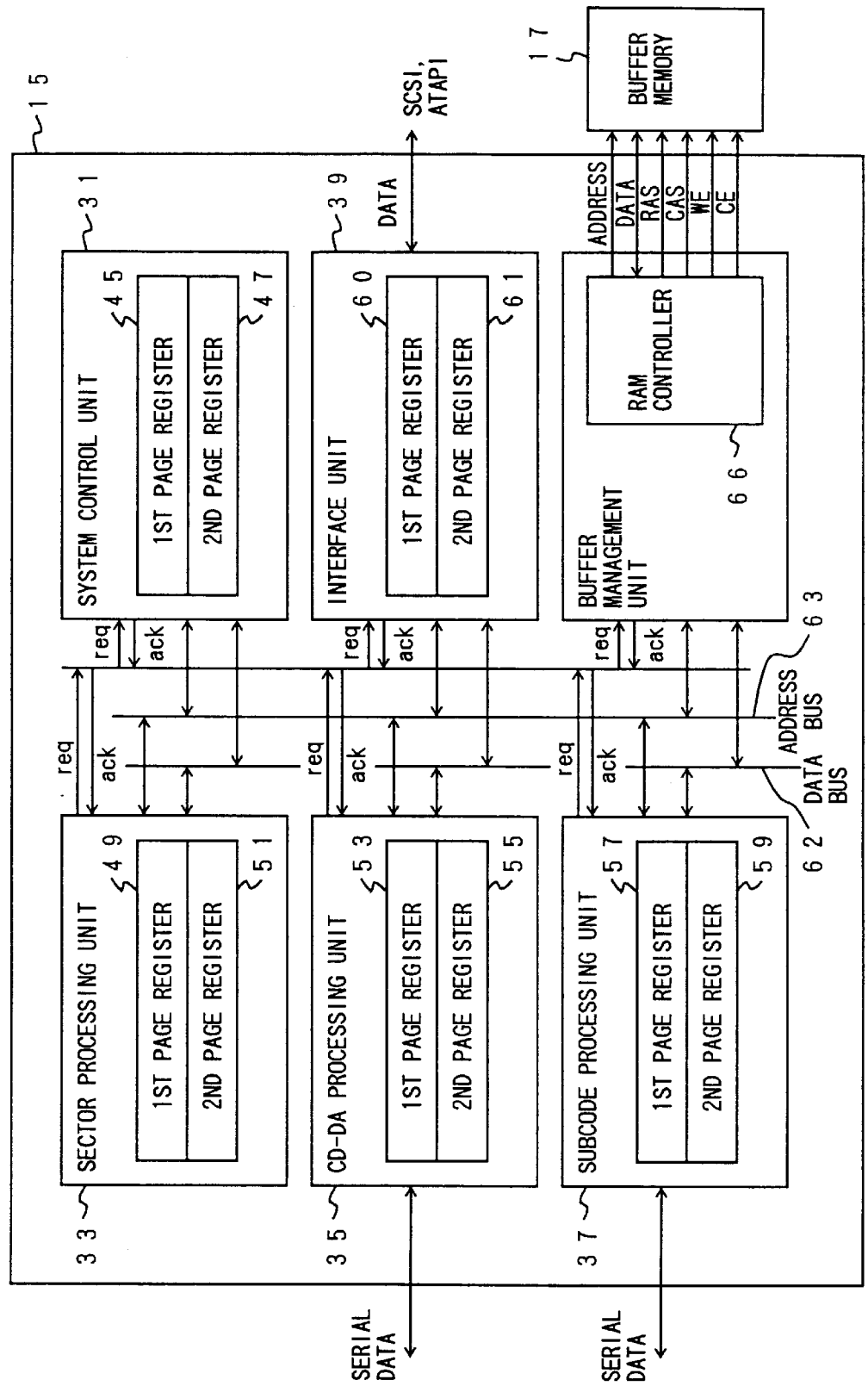
FIG. 5 is a block diagram of one embodiment of the data processing apparatus of the present invention.

FIG. 5 shows a first embodiment of the data processing apparatus of the present invention. The data processing apparatus of the present invention is incorporated into the compact disk drive of FIG. 1 instead of the conventional data processing unit 15. Elements of the compact disk drive other than the data processing apparatus, which are the same as corresponding elements in FIG. 1, are designated by the same reference numerals, and a description thereof will be omitted.

As shown in FIG. 5, the data processing apparatus of this embodiment comprises a system control unit 31, a sector processing unit 33, a CD-DA processing unit 35, a subcode processing unit 37, an interface unit 39, and a buffer management unit 41. These processing units of the data processing apparatus are interconnected by an internal data bus 62 and an internal address bus 63.

In the present embodiment, each of the processing units 31, 33, 35, 37 and 39 comprises two page registers. One of the page registers holds a page number which indicates an address of a particular one of the pages in the page area of the buffer memory (RAM) 17 (corresponding to the buffer memory 17 of FIG. 1). The page number stored in this page register represents a memory location of the page in the buffer memory 17, the page containing data to be processed by the relevant processing unit. The other page register holds a page number which indicates a specific one of the pages in the page area of the buffer memory 17. The page number stored in the second page register indicates a memory location of the page in the buffer memory 17 at which the processing by the processing unit is completed. The page number, held by the second page register of one processing unit, is detected by another processing unit, and progress of the processing by the processing unit is checked with the detected page number.

The page number stored in the first and second page registers is sequentially incremented from 0 to "n". When the page number stored in the first and second registers exceeds "n", the page number is reset to 0. The page number stored in the first and second page registers changes in a cyclic manner.

As shown in FIG. 5, the system control unit 31 comprises a first page register 45 and a second page register 47.

The first page register 45 holds a page number which indicates a specific one of the pages in the page area of the buffer memory 17. The page number stored in the first page register 45 represents a memory location of the page in the buffer memory 17, the page containing data to be processed by the system control unit 31. The second page register 47 holds a page number which indicates a specific one of the pages in the page area of the buffer memory 17. The page number stored in the second page register 47 indicates a memory location of the page in the buffer memory 17 at which the processing by the system control unit 31 is completed.

The system control unit 31 controls the respective processing units of the data processing apparatus by using the first and second page registers 45 and 47.

The CD-DA processing unit 35 comprises a first page register 53 and a second page register 55.

The first page register 53 holds a page number which indicates a specific one of the pages in the page area of the buffer memory 17. The page number stored in the first page register 53 represents a memory location of the page in the buffer memory 17, the page containing data to be processed by the CD-DA processing unit 35. The second page register 55 holds a page number which indicates a specific one of the pages in the page area of the buffer memory 17. The page number stored in the second page register 55 indicates a memory location of the page in the buffer memory 17 at which processing by the CD-DA processing unit 35 is completed.

The CD-DA processing unit 35 stores the main data (2352 bytes) of one block of the digital data output from the CD decoding unit 13, in the main data field (000h to 92Fh) of a particular page of the buffer memory 17. The CD-DA processing unit 35 stores the error detection bytes (EDB) of the same block, in the EDB field (930h to A55h) of the particular page of the buffer memory 17.

The sector processing unit 33 comprises a first page register 49 and a second page register 51.

The first page register 49 holds a page number which indicates a specific one of the pages in the page area of the buffer memory 17. The page number stored in the first page register 49 represents a memory location of the page in the buffer memory 17, the page containing data to be processed by the sector processing unit 33. The second page register 51 holds a page number which indicates a specific one of the pages in the page area of the buffer memory 17. The page number stored in the second page register 51 indicates a memory location of the page in the buffer memory 17 at which processing by the sector processing unit 33 is completed.

In the case in which the read data at the output of the CD decoding unit 13 is in the CD-ROM format, the sector processing unit 33 performs an error correction of the main data after the main data is stored in the buffer memory 17 by the CD-DA processing unit 35. In accordance with the CD-ROM format indicated by (B) in FIG. 4, the sector processing unit 33 stores processed data, including the sync pattern, the header, the subheader, the user data and the error codes (EDC/ECC), in the relevant fields (000h to 92Fh) of the particular page of the buffer memory 17. Further, the sector processing unit 33 stores the produced error detection bytes (EDB) in the EDB field (930h to A55h) of the particular page of the buffer memory 17.

The subcode processing unit 37 comprises a first page register 57 and a second page register 59.

The first page register 57 holds a page number which indicates a specific one of the pages in the page area of the buffer memory 17. The page number stored in the first page register 57 represents a memory location of the page in the buffer memory 17, the page containing data to be processed by the subcode processing unit 37. The second page register 59 holds a page number which indicates a specific one of the pages in the page area of the buffer memory 17. The page number stored in the second page register 59 indicates a memory location of the page in the buffer memory 17 at which processing by the subcode processing unit 37 is completed.

The subcode processing unit 37 stores the subcodes (96 bytes) of one block of the digital data output from the CD decoding unit 13, in the subcode field (A80h to ADFh) of the particular page of the buffer memory 17. The subcode field of the buffer memory 17 is indicated by either (B) or (C) in FIG. 4.

The interface unit 39 comprises a first page register 60 and a second page register 61.

The first page register 60 holds a page number which indicates a specific one of the pages in the page area of the buffer memory 17. The page number stored in the first page register 60 represents a memory location of the page in the buffer memory 17, the page containing data to be processed by the interface unit 39. The second page register 61 holds a page number which indicates a specific one of the pages in the page area of the buffer memory 17. The page number stored in the second page register 61 indicates a memory location of the page in the buffer memory 17 at which the processing by the interface unit 39 is completed.

The interface unit 39 further comprises an area designation register and other registers (not shown in FIG. 5) which will be described later. The interface unit 39 transfers data from the buffer memory 17 to the host computer 19 through the external interface, such as a SCSI interface or an ATAPI interface, or vice versa. The interface unit 39 stores the block error flag of one block of the digital data output from the CD decoding unit 13, in the block error flag field (A56h to A58h) of the particular page of the buffer memory 17. The block error flag field of the buffer memory 17 is indicated by either (B) or (C) in FIG. 4.

In the present embodiment, the page number, stored in each of the page registers 45 through 61, is represented by 12 bits, and the 12 bits of the page number determine the value of the high-order bits of a specific address of the buffer memory 17 at which the data to be processed by the relevant unit is stored or at which the processing by the relevant unit is completed.

Figure 6:
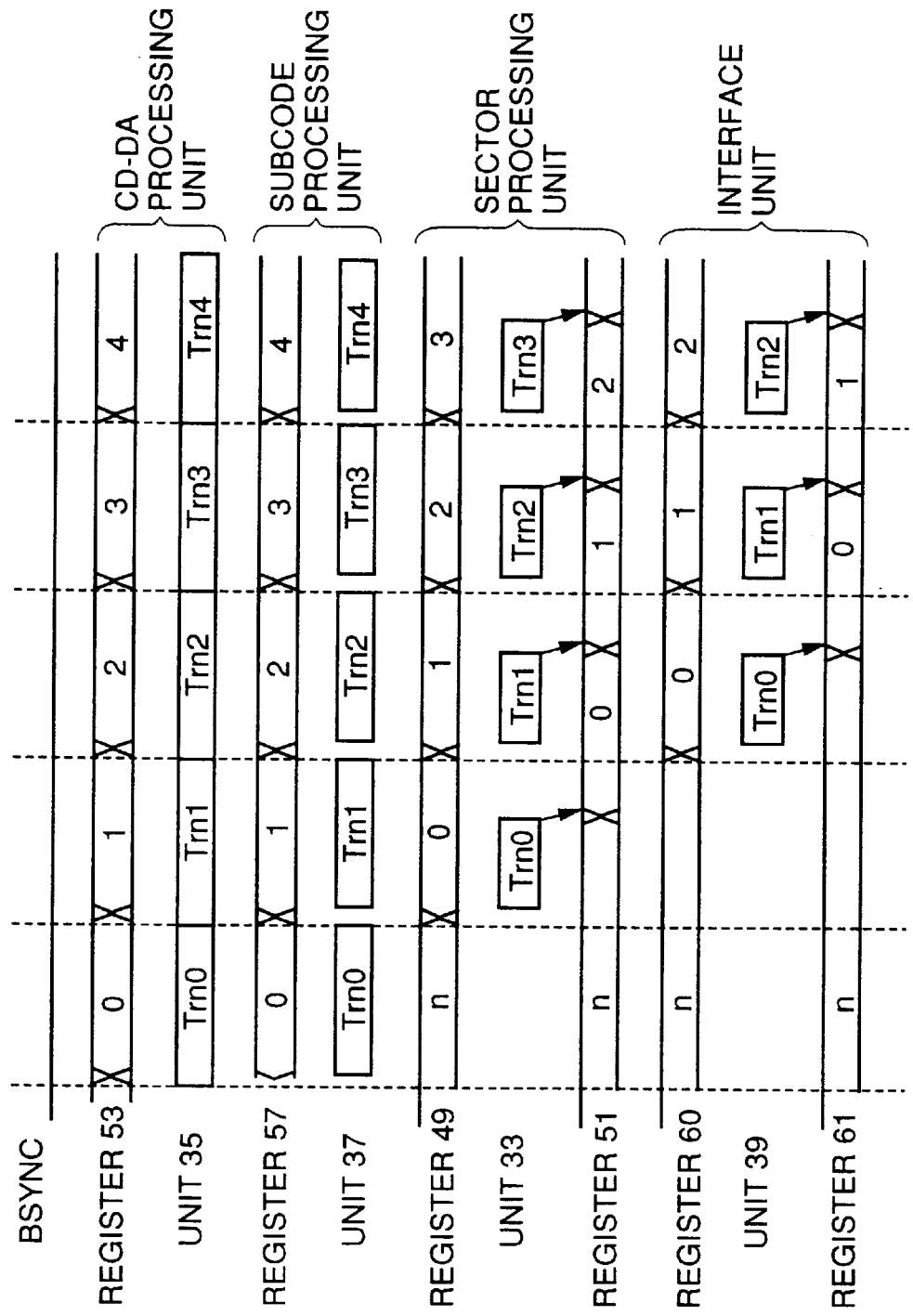
FIG. 6 is a time chart for explaining operations of the processing units of the data processing apparatus of FIG. 5 during a decoding process.

FIG. 6 is a time chart for explaining operations of the processing units of the data processing apparatus of FIG. 5 during a decoding process.

The processing units of the data processing apparatus are controlled such that the data processing is carried out on a block-unit basis (or on a sector-unit basis). The main data (2352 bytes) of each block output from the CD decoding unit 13 is input to the CD-DA processing unit 35. The subcodes (96 bytes) of each block output from the CD decoding unit 13 is input to the subcode processing unit 37.

In FIG. 6, "BSYNC" indicates a synchronizing signal used to segment the digital data output from the CD decoding unit 13 into blocks. In FIG. 6, "Trn0", "Trn1", the digital data is being processed.

As shown in FIG. 6, when the decoding process of the first block ("Trn0") is started, the first page register 53 of the CD-DA processing unit 35 and the first page register 57 of the subcode processing unit 37 are reset to zero (the page number being set at zero) by the system control unit 31. The CD-DA processing unit 35 stores the main data (2352 bytes) of the first block output from the CD decoding unit 13, in the main data field (000h to 92Fh) of the particular page of the buffer memory 17, and stores the error detection bytes (EDB) of the first block in the EDB field (930h to A55h) of the particular page of the buffer memory 17. As the first page register 57 is reset to zero at the same time, the subcode processing unit 37 stores the subcodes (96 bytes) of the first block into the subcode field (A80h to ADFh) of the particular page of the buffer memory 17.

The first page register 49 of the sector processing unit 33 is reset to zero (the page number being set at zero) by the system control unit 31 at a subsequent time when the decoding process of the second block ("Trn1") is started. The first page register 60 of the interface unit 39 is reset to zero (the page number being set at zero) by the system control unit 31 at a subsequent time when the decoding process of the third block ("Trn2") is started.

The interface unit 39 stores the block error flag of the first block in the block error flag field (A56h to A58h) of the particular page of the buffer memory 17. When the decoding process of the first block ("Trn0") is finished, both the page number in the first page register 53 and the page number in the first page register 57 are incremented to 1. Then, the decoding process of the second block ("Trn1") is started. At the same time, the second page register 55 of the CD-DA processing unit 35 and the second page register 59 of the subcode processing unit 37 are reset to zero (or the page number being set at zero) by the system control unit 31.

When the decoding process of the second block ("Trn1") is performed, the CD-DA processing unit 35 stores the main data of the second block output from the CD decoding unit 13, in the main data field of the particular page of the buffer memory 17, and stores the error detection bytes (EDB) of the second block in the EDB field of the particular page of the buffer memory 17. At the same time, the subcode processing unit 37 stores the subcodes of the second block in the subcode field of the particular page of the buffer memory 17.

In the case in which the read data at the output of the CD decoding unit 13 is in the CD-ROM format, by making reference to the second page register 55 of the CD-DA processing unit 35, the sector processing unit 33 detects that the page number of the second page register 55 is set at zero, which indicates that the processing of the first block ("Trn0") is completed. The sector processing unit 33 performs an error correction of the main data (2352 bytes) and the EDB (294 bytes) of the first block. In accordance with the CD-ROM format indicated by (B) in FIG. 4, the sector processing unit 33 stores the produced data of the first block in the relevant fields (000h to 92Fh) of the particular page of the buffer memory 17, and stores the produced error detection bytes (EDB) in the EDB field (930h to A55h) of the particular page of the buffer memory 17. When the processing of the first block by the sector processing unit 33 is completed, the page number in the first page register 49 is incremented to 1 and the page number in the second page register 51 is reset to 0.

When the decoding process of the third block ("Trn2") is performed, the CD-DA processing unit 35 stores the main data of the third block output from the CD decoding unit 13, in the main data field of the particular page of the buffer memory 17, and stores the error detection bytes (EDB) of the third block in the EDB field of the particular page of the buffer memory 17. At the same time, the subcode processing unit 37 stores the subcodes of the third block in the subcode field of the particular page of the buffer memory 17.

At this time, both the page number in the first page register 53 and the page number in the first page register 57 are incremented to 2, and the second page register 55 of the CD-DA processing unit 35 and the second page register 59 of the subcode processing unit 37 are incremented to 1. The page number in the first page register 49 is incremented to 1, and the sector processing unit 33 performs an error correction of the main data (2352 bytes) and the EDB (294 bytes) of the second block ("Trn1"). When the processing of the first block by the sector processing unit 33 is completed, the interface unit 39 transfers, by making reference to the page number of the second page register 51, the data of the first block ("Trn0") to the host computer 19. After the data transfer by the interface unit 39 is completed, the page number in the first page register 60 is incremented to 1, and the page number in the second page register 61 is reset to 0.

When the decoding process of the third block ("Trn2") is finished, the CD-DA processing unit 35 stores the main data of the fourth block ("Trn3") output from the CD decoding unit 13, in the main data field of the particular page of the buffer memory 17, and stores the error detection bytes (EDB) of the fourth block in the EDB field of the particular page of the buffer memory 17. At the same time, the subcode processing unit 37 stores the subcodes of the fourth block in the subcode field of the particular page of the buffer memory 17.

The sector processing unit 33 performs an error correction of the third block ("Trn2"), the page number of which is indicated by the first page register 49. The interface unit 39 performs the data transfer of the second block ("Trn1") to the host computer 19, the page number of which is indicated by the first page register 60. In this manner, the data processing by the data processing apparatus is carried out on a block-unit basis, and the processed data is sequentially transferred to the host computer 19.

In the above-described embodiment of FIG. 6, the case in which the digital data at the output of the CD decoding unit 13 is in the CD-ROM format is treated. In the case in which the digital data at the output of the CD decoding unit 13 is in the CD-DA format, the above operation of the sector processing unit 33 is not performed. In such a case, immediately after the processing by the CD-DA processing unit is completed, the data transfer by the interface unit 39 is performed.

Figure 7:
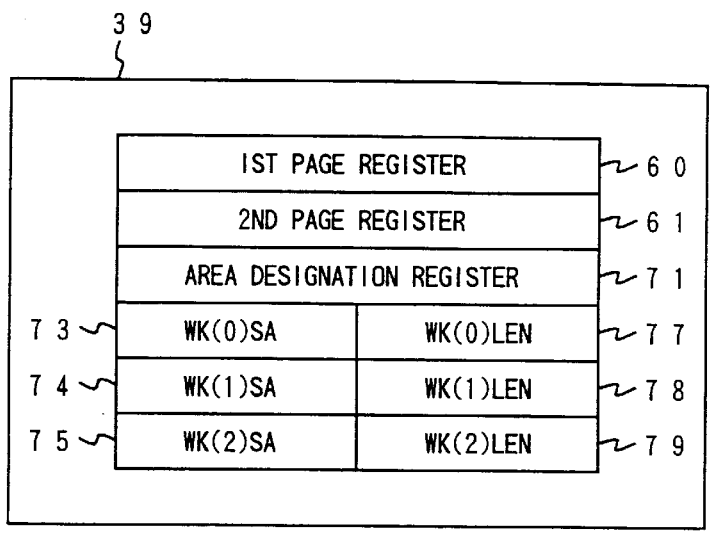
FIG. 7 is a block diagram showing the basic elements of an interface unit of the data processing apparatus of FIG. 5.

FIG. 7 shows the basic elements of the interface unit 39 of the data processing apparatus of FIG. 5. The system control unit 31 sets an area designation register 71 of the interface unit 39 in an appropriate state when data is transferred to the host computer 19 by the interface unit 39.

As shown in FIG. 7, the interface unit 39 includes not only the first and second page registers 60 and 61 but also the area designation register 71 and a plurality of working registers. The working registers are comprised of: a first starting address register "WK(0)SA" 73 and a first length register "WK(0)LEN" 77; a second starting address register "WK(1)SA" 74 and a second length register "WK(1)LEN" 78; and a third starting address register "WK(2)SA" 75 and a third length register "WK(2)LEN" 79. Each of the starting address registers 73, 74 and 75 contains bits indicating the starting address of an arbitrary area of the buffer memory 17 in which the stored data is to be transferred. Each of the length registers 77, 78 and 79 contains bits indicating the length of the arbitrary area of the buffer memory 17 in which the stored data is to be transferred.

Figure 8:
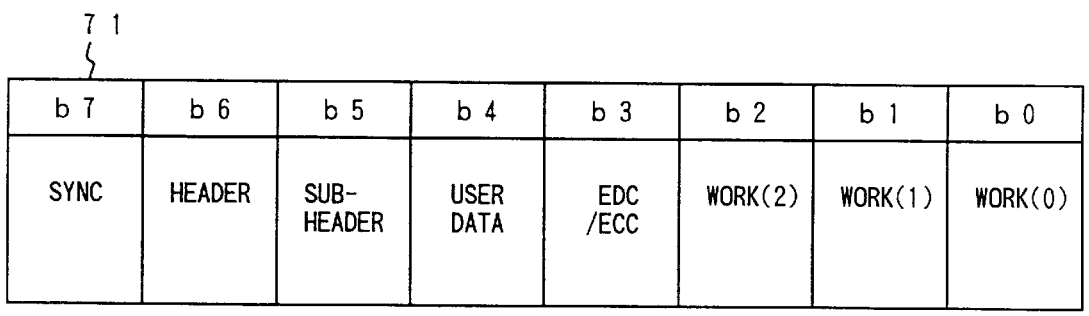
FIG. 8 is a diagram of a format of the bits of an area designation register of FIG. 7.

FIG. 8 shows a format of the bits of the area designation register 71 of FIG. 7.

As shown in FIG. 8, the area designation register 71 includes 8 bits having the least significant bit "b0" through the most significant bit "b7". The system control unit 31 performs an area designation of the stored data of the buffer memory 17 being transferred to the host computer 19, by setting the relevant bits of the area designation register 71 of the interface unit 39 at As shown in FIG. 8, the most significant bit "b7" of the area designation register 71 is set at "1" to designate the sync pattern field (000h–00Bh) of the particular page of the stored data in the buffer memory 17. The bit "b6" of the area designation register 71 is set at "1" to designate the header field (00Ch–00Fh) of the particular page of the stored data in the buffer memory 17. The bit "b5" of the area designation register 71 is set at "1" to designate the subheader field (010h–017h) of the particular page of the stored data in the buffer memory 17. The bit "b4" of the area designation register 71 is set at "1" to designate the user data field (018Ch–817h) of the particular page of the stored data in the buffer memory 17. The bit "b3" of the area designation register 71 is set at "1" to designate the EDC/ECC field (818h–92Fh) of the particular page of the stored data in the buffer memory 17.

Further, as shown in FIG. 8, the bit "b2" of the area designation register 71 is set at "1" to designate an arbitrary area of the particular page of the stored data in the buffer memory 17, the arbitrary area having the starting address indicated by the register WK(2)SA 75 and the length indicated by the register WK(2)LEN 79. The bit "b1" of the area designation register 71 is set at "1" to designate an arbitrary area of the particular page of the stored data in the buffer memory 17, the arbitrary area having the starting address indicated by the register WK(1)SA 74 and the length indicated by the register WK(1)LEN 78. The least significant bit "b0" of the area designation register 71 is set at "1" to designate an arbitrary area of the particular page of the stored data in the buffer memory 17, the arbitrary area having the starting address indicated by the register WK(0)SA 73 and the length indicated by the register WK(0)LEN 77.

The bits "b7" through "b3" of the area designation register 71 are set at "1" when the read data is in the CD-ROM format and the relevant data item in the designated area of the processed data stored in the buffer memory 17 is transferred to the host computer 19. The bits "b2" through "b0" of the area designation register 71 are set at "1" when the relevant data item in the designated arbitrary area of the stored data is transferred to the host computer 19. The system control unit 31 sets the area designation register 71 based on an instruction sent from the host computer 19. The data item in the designated area of the stored data according to the setting of the area designation register 71 is transferred to the host computer 19 by the interface unit 39.

When each of the processing units 31 through 39 of the data processing apparatus is going to access the contents of the buffer memory 17, the unit sends an access request to the buffer management unit 41. The buffer management unit 41 performs an arbitration between the access requests sent from the processing units 31 through 39, and sends an acknowledgement signal to a selected one of the processing units 31 through 39 to allow the selected unit to access the contents of the buffer memory 17. The selected unit sends an address to the buffer management unit 41, the address indicating the memory location of the buffer memory 17 at which the data to be processed by the selected unit is stored.

Figure 9:
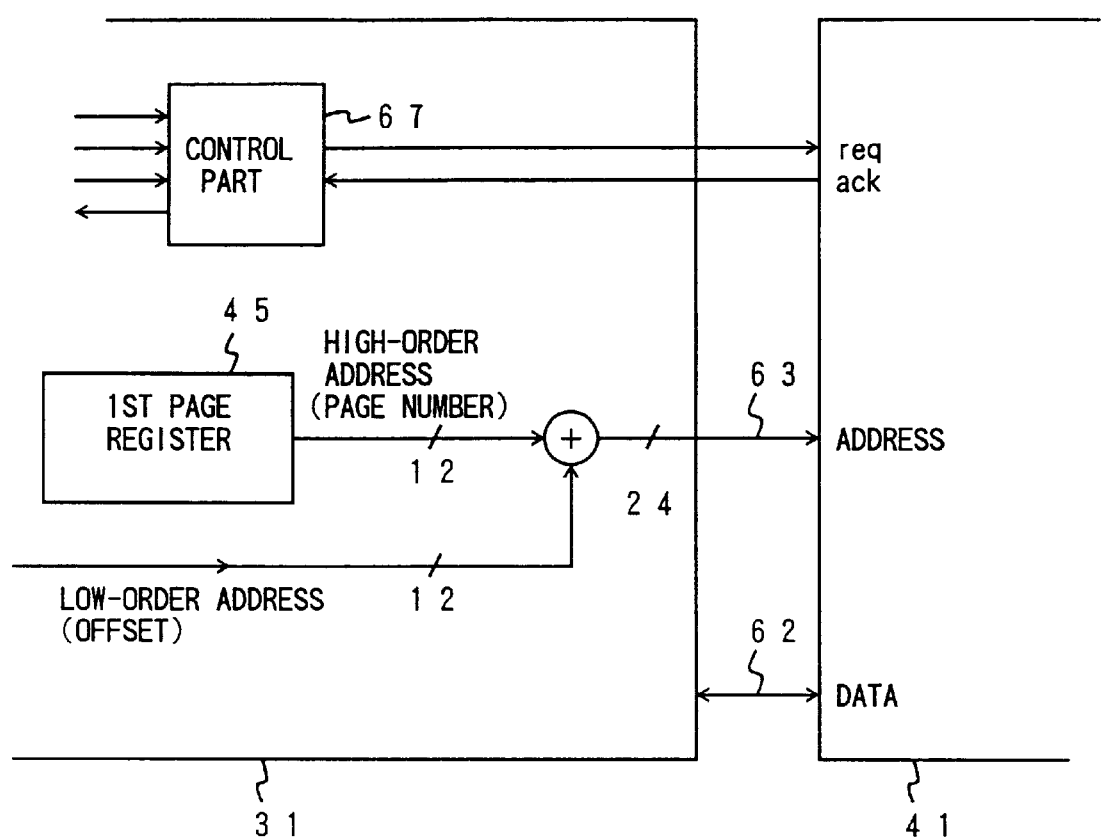
FIG. 9 is a diagram for explaining an operation performed between a system control unit and a buffer management unit when the data of the buffer memory is accessed by the system control unit.

FIG. 9 shows an operation performed between the system control unit 31 and the buffer management unit 41 when the data of the buffer memory 17 is accessed by the system control unit 31.

As shown in FIG. 9, the system control unit 31 comprises a control part 67 which sends an access request to and receives an acknowledgement signal from the buffer management unit 41. The control part 67 sends an access request to the buffer management unit 41. After the arbitration between the access requests from the processing units 31 through 39 is performed, the buffer management unit 41 sends an acknowledgement signal back to the control part 67 to allow the system control unit 31 to access the contents of the buffer memory 17. Then, the system control unit 31 sends an address to the buffer management unit 41 via the internal address bus 63 (and in some case, sends data to the buffer management unit 41 via the internal data bus 62), so that the data of the buffer memory 17 is accessed by the system control unit 31 through a RAM controller 66 of the buffer management unit 41. The RAM controller 66 perform the data transfer between the buffer memory 17 and the system control unit 31 by using a known data transfer technique.

At this time, in the system control unit 31, a 24-bit address to be sent to the buffer management unit 41 is generated by combining the page number (12 bits) stored by the first page register 45 with a predetermined offset (12 bits) of the relevant field of the page determined by the system control unit 31. As described above, in order to specify the memory location of the buffer memory 17 at which the data to be accessed is stored, it is necessary to send the 24-bit address to the buffer management unit 41. The 12 bits of the page number determine the value of the high-order bits of the address to be sent to the buffer management unit 41. As shown in FIG. 4, the offset of each of the fields of one of the pages in the page area of the buffer memory 17 is predetermined. Even when any of the pages in the page area of the buffer memory 17 is indicated by the page number of the first page register 45, the system control unit 31 determines the 12-bit offset of the relevant field of the page as the value of the low-order bits of the address to be sent to the buffer management unit 41. Therefore, the system control unit 31 generates the 24-bit address by combining the page number stored by the first page register 45 with the offset determined by the system control unit 31. That is, the address generated by the system control unit 31 has the high-order 12 bits of the page number and the low-order 12 bits of the offset.

After the address is sent from the system control unit 31 to the buffer management unit 41 (and in some case, the data is sent to the buffer management unit 41), the buffer management unit 41 reads the data from or writes the data to the buffer memory 17 by using the address. The data is transferred between the system control unit 31 and the buffer management unit 41 via the internal data bus 62.

In the above-described embodiment, the address used to access the data of the buffer memory is specified by combining the page number stored by the page register with the offset determined by the relevant processing unit. The high-order bits of the address are determined by the page number, and the low-order bits of the address are determined by the offset. The address can be easily generated by the relevant processing unit with a simple circuit, and the generation of the address does not require an arithmetic operation such as addition or multiplication. Therefore, the data processing apparatus of the present invention efficiently processes data of the compact digital disk and provides an increased data processing speed.

In the above-described embodiment, a data processing operation similar to the operation of FIG. 9 is performed by all the other processing units 33 through 39 of the data processing apparatus in conjunction with the buffer management unit 41 when the data of the buffer memory 17 is accessed by the processing units, and a description thereof will be omitted.

Figure 10:
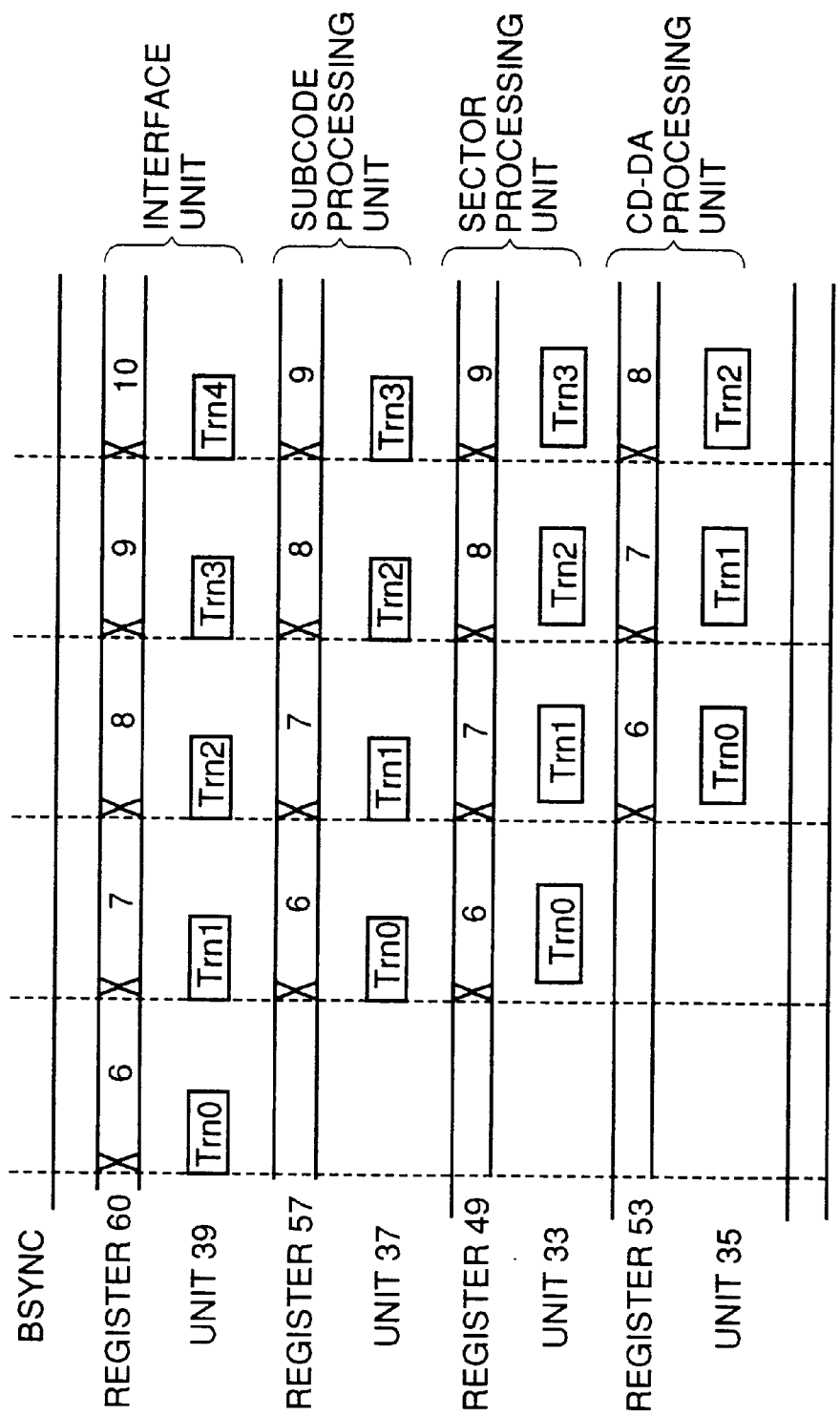
FIG. 10 is a time chart for explaining operations of the processing units of the data processing apparatus during an encoding process.

FIG. 10 is a time chart for explaining operations of the processing units of the data processing apparatus of FIG. 5 during an encoding process.

The encoding process is performed before the writing of the data from the host computer 19 to the compact digital disk 10 such as the CD-R disk. Hereinafter, the compact digital disk 10 is called the disk 10.

During the encoding process, one sector of a predetermined link data and four sectors of a predetermined run-in data are written to the disk 10. After this, the writing of the data from the host computer 19 to the disk 10 at the sixth and subsequent sectors is performed. After the writing of the data from the host computer 19 is completed, two sectors of a predetermined run-out data are written to the disk 10. Then, the encoding process is finished. The link data, the run-in data and the run-out data are written to the page area of the buffer memory 17 by the system control unit 31. The format of the page area of the buffer memory 17 used during the encoding process is the same as the format of the page area of the buffer memory 17 used during the decoding process.

In FIG. 10, "BSYNC" indicates a synchronizing signal used to segment the digital data output from the host computer 19 into a plurality of sectors. In FIG. 10, "Trn0", "Trn1", . . . indicate which turn of the sectors in the sequence of the digital data is being processed.

During the encoding process, the interface unit 39 respectively stores a user data and a subcode of the digital data, supplied by the host computer 19 via the external interface such as a SCSI interface, in a user data field and a subcode field of a particular page of the buffer memory 17. The interface unit 39 has the first page register 60 which holds a page number specifying an address of the particular page of the buffer memory 17.

The subcode processing unit 37 performs a CRC (cyclic redundancy check) operation on the subcode, stored in the subcode field of the particular page of the buffer memory 17, to produce a processed data. The subcode processing unit 37 outputs the processed data to the CD encoding unit 14. The subcode processing unit 37 has the first page register 57 which holds a page number which is the same as the page number held by the first page register 60 of the interface unit 39.

The sector processing unit 33 generates a header, a subheader, an error detection code (EDC) and an error correction code (ECC) with respect to the user data stored in the user data field of the particular page of the buffer memory 17, by executing predetermined computations. The sector processing unit 33 stores the header, the subheader, the error detection code (EDC) and the error correction code (ECC), in the corresponding fields (indicated by (B) in FIG. 4) of the particular page of the buffer memory 17 to form a main data stored in the main data field (indicated by (C) in FIG. 4) of the particular page of the buffer memory 17. The sector processing unit 33 has the first page register 49 which holds a page number which is the same as the page number held by the first page register 60 of the interface unit 39.

The CD-DA processing unit 35 outputs the main data, stored in the main data field of the particular page of the buffer memory 17, to the CD encoding unit 14. The CD-DA processing unit 35 has the first page register 53 which holds a page number which is the same as the page number held by the first page register 49 of the sector processing unit 33.

As shown in FIG. 10, when the encoding process is started, the first page register 60 of the interface unit 39 is set at "6" (or the page number being set at 6 in decimal) by the system control unit 31.

After the link data and the run-in data are written to the disk 10, the first sector ("Trn0") of the digital data, including the user data and the subcode, is transferred from the host computer 19 to the interface unit 39. The interface unit 39 stores the user data and the subcode in the user data field and the subcode field of the particular page of the buffer memory 17. The address of this page of the buffer memory 17 is specified by the page number "6" held by the first page register 60. After the writing of the user data and the subcode to the buffer memory 17 is completed, the first page register 60 is incremented to "7". Similarly, the interface unit 39 processes the second sector ("Trn1") of the digital data and stores the processed data in a memory location of the buffer memory 17 specified by the page number of the first page register 60.

As shown in FIG. 10, after the processing of the first sector ("Trn0") by the interface unit 39 is completed, the subcode processing unit 37 starts performing the CRC operation on the subcode stored in the subcode field of the particular page of the buffer memory 17, to produce a processed data. The address of this page of the buffer memory 17 is specified by the page number of the first page register 57, which is the same as the page number "6" of the first page register 60 at the previous cycle. The subcode processing unit 37 outputs the processed data to the CD encoding unit 14. After the processing by the subcode processing unit 37 is completed, the first page register 57 is incremented to "7".

At the same time, the sector processing unit 33 generates the header, the subheader, the error detection code (EDC) and the error correction code (ECC) with respect to the user data stored in the user data field of the particular page of the buffer memory 17. The address of this page of the buffer memory 17 is specified by the page number of the first page register 49, which is the same as the page number "6" of the first page register 60 at the previous cycle. The sector processing unit 33 stores the header, the subheader, the error detection code (EDC) and the error correction code (ECC), in the corresponding fields of the particular page of the buffer memory 17 to form the main data stored in the main data field of the particular page of the buffer memory 17. After the processing by the sector processing unit 33 is completed, the first page register 49 is incremented to As shown in FIG. 10, after the processing of the second sector ("Trn1") by the interface unit 39 is completed, the CD-DA processing unit 35 starts outputting the main data, stored in the main data field of the particular page of the buffer memory 17, to the CD encoding unit 14. The address of this page of the buffer memory 17 is specified by the page number of the first page register 53, which is the same as the page number "6" of the first page register 49 at the previous cycle. After the processing by the CD-DA processing unit 35 is completed, the first page register 53 is incremented to "7".

In the same manner, the interface unit 39, the subcode processing unit 37, the sector processing unit 33 and the CD-DA processing unit 35 carry out the encoding process in accordance with the page number of the relevant page register.

Therefore, similar to the decoding process, during the encoding process, the address used to access the data of the buffer memory is specified by combining the page number stored by the page register with the offset determined by the relevant processing unit. The high-order bits of the address are determined by the page number, and the low-order bits of the address are determined by the offset. The address can be easily generated by the relevant processing unit with a simple circuit, and the generation of the address does not require an arithmetic operation such as addition or multiplication. Therefore, during the encoding process, the data processing apparatus of the present invention efficiently processes data of the compact digital disk and provides an increased data processing speed.

In the above embodiment of FIG. 10, the subcode processing unit 37 and the sector processing unit 33 perform the respective processing at the same time. Alternatively, the subcode processing unit 37 and the CD-DA processing unit 35 may perform the respective processing at the same time.

Figure 11:
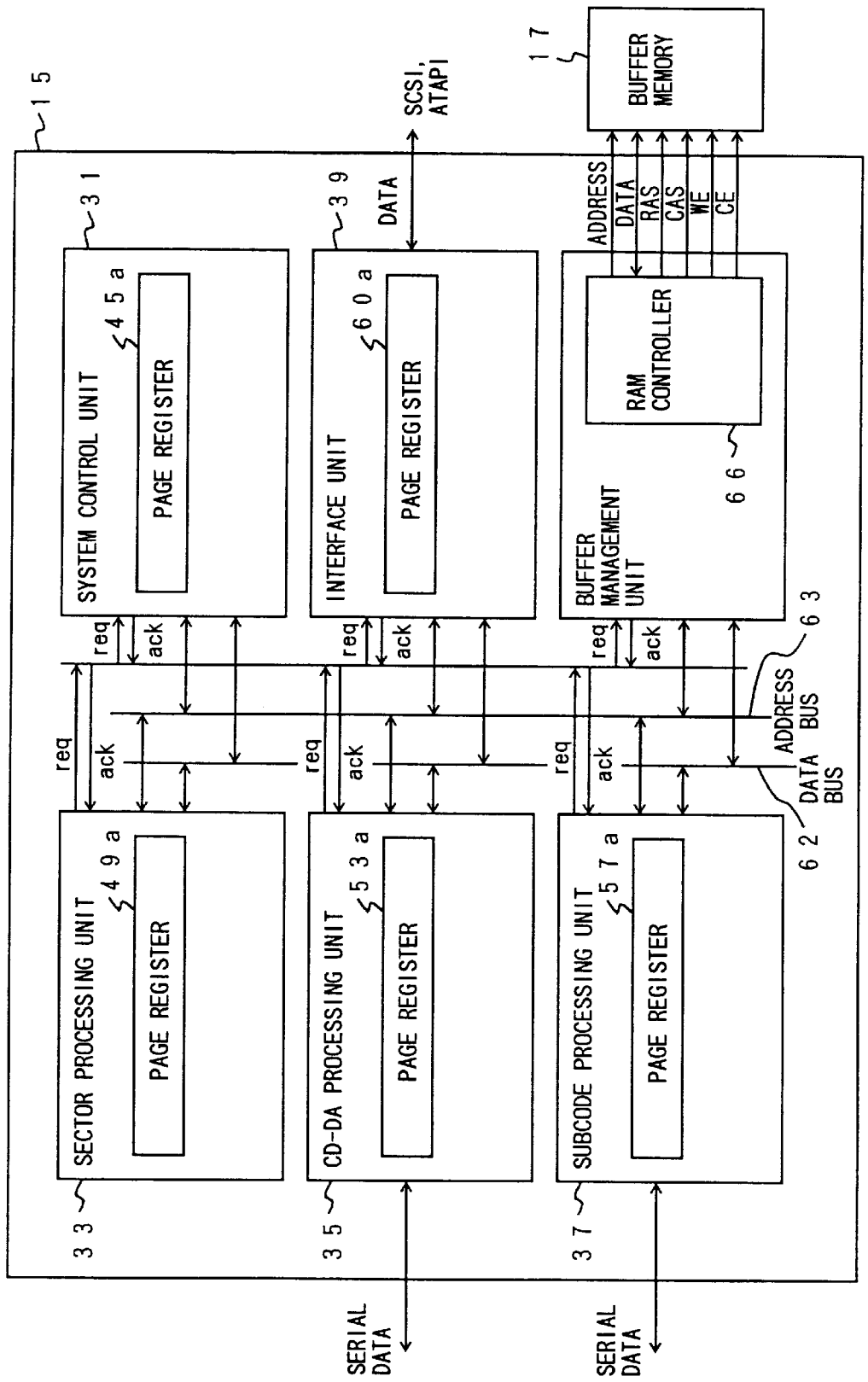
FIG. 11 is a block diagram of a second embodiment of the data processing apparatus of the present invention.

Next, FIG. 11 shows a second embodiment of the data processing apparatus of the present invention. In FIG. 11, the elements which are the same as corresponding elements in FIG. 5 are designated by the same reference numerals, and a description thereof will be omitted.

In the present embodiment, the arrangement of the data stored in the buffer memory (RAM) 17 is the same as the arrangement of the data shown in FIG. 4. Each of the processing units 31, 33, 35, 37 and 39 of the present embodiment includes a single page register only. The page registers of these processing units are the same as the first page registers of FIG. 5. That is, the page registers hold the page number which indicates an address of a particular one of the pages in the page area of the buffer memory 17, the page being processed by the relevant processing unit.

As shown in FIG. 11, the system control unit 31, the sector processing unit 33, the CD-DA processing unit 35, the subcode processing unit 37, and the interface unit 39 includes a page register 45a, a page register 49a, a page register 53a, a page register 57a, and a page register 60a, respectively.

Figure 12:
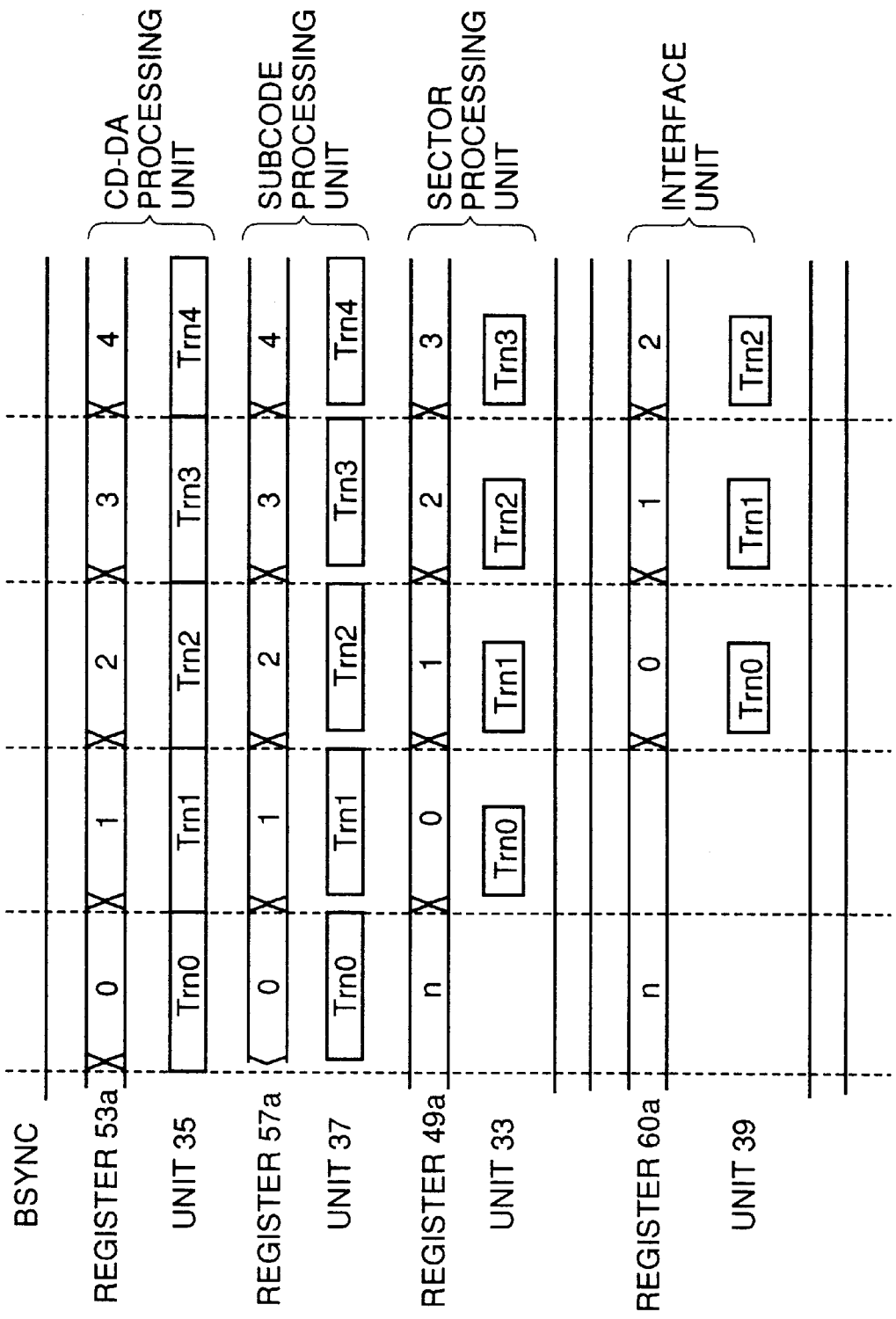
FIG. 12 is a diagram for explaining operations of the processing units of the data processing apparatus of the second embodiment during a decoding process.

FIG. 12 shows operations of the processing units of the data processing apparatus of FIG. 11 during the decoding process.

The operations of the processing units of the present embodiment are essentially the same as the operations of the processing units of the embodiment shown in FIGS. 5 and 6. However, the processing units 31 through 39 of the present embodiment do not include the second page registers 47, 51, 55, 59 and 61 which are included in the embodiment of FIG. 5. Thus, in the operations of the processing units of the present embodiment, the incrementing operation of each of the second page registers is not performed, and the detection of the page number of the second page register of one processing unit by another processing unit to check the progress of the processing of the former processing unit is not performed.

For example, after the processing of the first block ("Trn0") of the digital data by the CD-DA processing unit 35 is completed, the sector processing unit 33 starts performing the error correction of the data of the first block ("Trn0") of the digital data. At this time, it is necessary to make a determination as to whether the page (or the first block) specified by the page number of the page register 49a of the sector processing unit 33 is already processed by the CD-DA processing unit 35. In the present embodiment, the determination is made by comparing the page number of the page register 49a with the page number of the page register 53a. In the sector processing unit 33, when the page number of the page register 49a is smaller than the page number of the page register 53a, it is determined that the page specified by the page number of the page register 49a is already processed by the CD-DA processing unit 35. Then, the sector processing unit 33 starts performing the error correction of the data of the page (or the first block).

Also, the interface unit 39 performs a similar operation to determine whether the page specified by the page number of the page register 60a of the interface unit 39 is already processed by the sector processing unit 33. Further, during the encoding processing, conversely, the sector processing unit 33 compares the page number of the page register 49a with the page number of the page register 60a to determine whether the page specified by the page number of the page register 49a is already processed by the interface unit 39.

In this manner, the processing units of the present embodiment can check the progress of the processing of the preceding processing unit without performing the detection of the page number of the second page register of the preceding processing unit by the following processing unit as in the embodiment of FIGS. 5 and 6.

Figure 13:
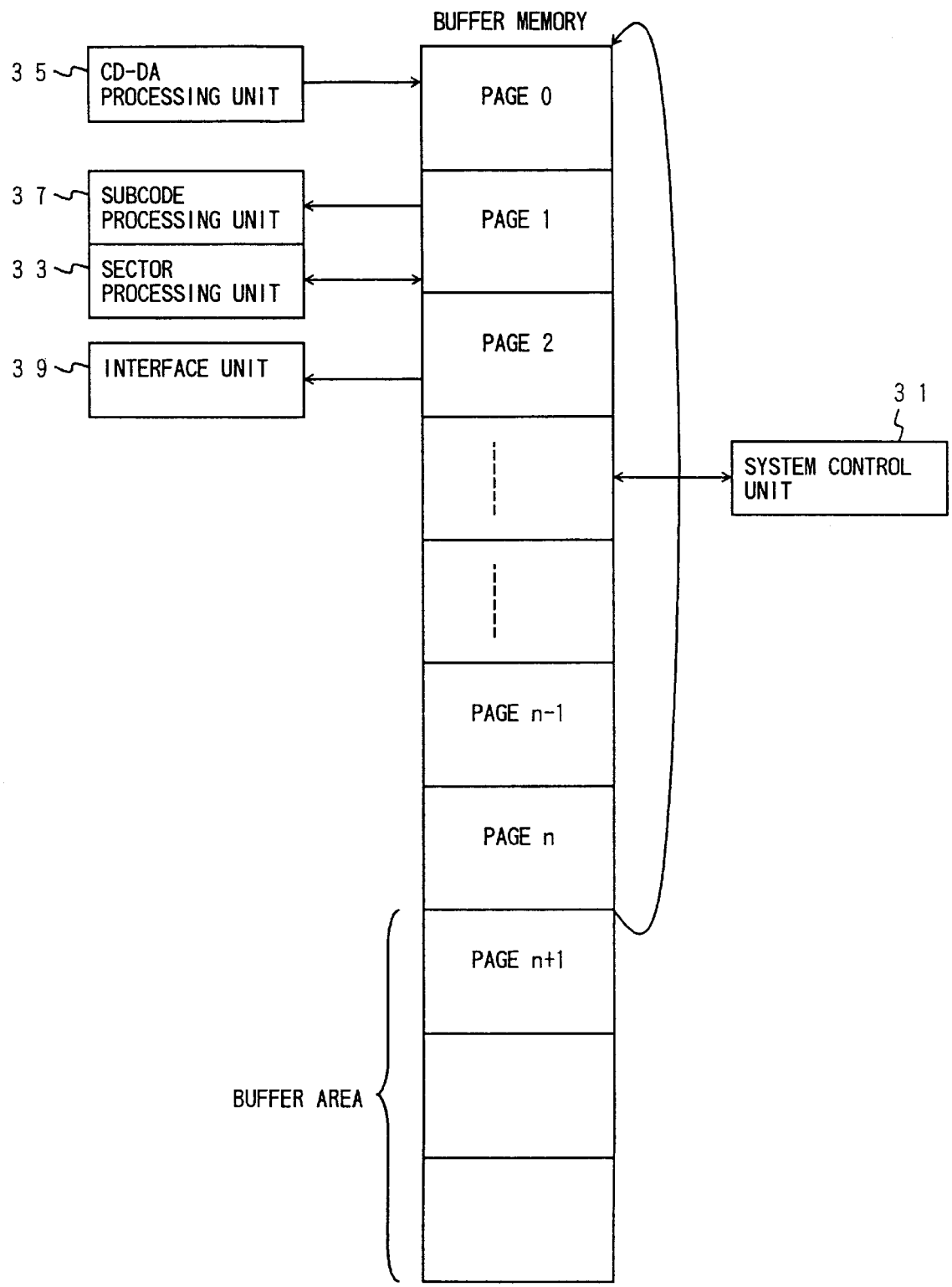
FIG. 13 is a diagram for explaining operations of the processing units of the data processing apparatus of the second embodiment during an encoding process.

FIG. 13 shows operations of the processing units of the data processing apparatus of the present embodiment during the encoding process.

As shown in FIG. 13, at the time the system control unit 31 processes the page 3 of the buffer memory 17, the interface unit 39 processes the page 2, the sector processing unit 33 and the subcode processing unit 37 process the page 1, and the CD-DA processing unit 35 processes the page 0. During the encoding process, the interface unit 39, the sector processing unit 33, the subcode processing unit 37 and the CD-DA processing unit 35 perform the respective operations with respect to the same page, in this order.

During the encoding process, the data processing apparatus temporarily stores the data output from the host computer 19 in the buffer memory 17 and produces a sequence of serial digital data to be written to the disk 10, and there is a possibility that a buffer underrunning condition of the data processing apparatus take place. In the buffer underrunning condition, the quantity of the data supplied from the buffer memory 17 to be written to the disk 10 exceeds the quantity of the data supplied from the host computer 19 to the buffer memory 17 to be processed by the data processing apparatus. If the buffer underrunning condition takes place, the supplying of the data from the buffer memory 17 to the data processing apparatus is interrupted and the writing of data to the disk 10 stops. Also, the transferring of the data from the host computer 19 to the buffer memory 17 is interrupted.

Therefore, in order to enable the data processing apparatus to safely continue to perform the encoding process without interruption even when the buffer underrunning condition occurs, it is necessary to detect whether the data processing apparatus is in the buffer underrunning condition during the encoding process.

Referring back to FIG. 13, in the data processing apparatus of the present embodiment, when the buffer underrunning condition takes place, the processing by the interface unit 39 is delayed and follows the processing by the processing units 33, 35 and 37. That is, in such a case, the page number of the page register 60a of the interface unit 39 is equal to or smaller than the page number of one of the page registers 49a, 53a and 57a of the processing units 33, 35 and 37.

In the data processing apparatus of the present embodiment, the occurrence of the buffer underrunning condition during the encoding process is detected by comparing the page number of the page register 60a with the page number of the page register 53a.

Figure 14:
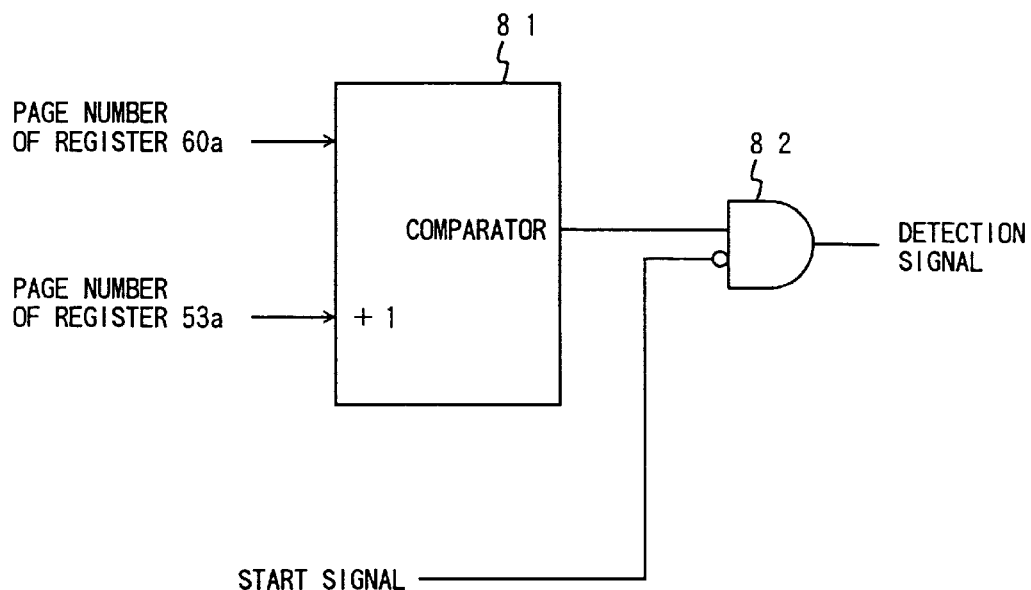
FIG. 14 is a circuit diagram of a buffer underrunning detection unit in the data processing apparatus of the second embodiment.

FIG. 14 shows a buffer underrunning detection unit in the data processing apparatus of the present embodiment.

As shown in FIG. 14, the buffer underrunning detection unit comprises a comparator 81 and an AND gate 82. The page number of the page register 53a and the page number of the page register 60a are input to the comparator 81. In the comparator 81, the page number of the page register 53a from the CD-DA processing unit 35 is incremented by 1, and the resulting value is compared with the page number of the page register 60a from the interface unit 39. The comparator 81 outputs an ON signal to the AND gate 82 when the incremented value of the page number of the page register 53a is equal to or greater than the page number of the page register 60a. This is because, when the buffer underrunning condition does not occur, the page number of the page register 53a is smaller than the page number of the page register 60a by 2.

The ON signal from the comparator 81 and a start signal indicating the time of start of the operation are input to the AND gate 82. The AND gate 82 outputs a detection signal by taking a logical conjunction between the ON signal and the start signal. At the start of the operation of the data processing apparatus, the page numbers of the page registers 53a and 60a are the same. To avoid an error at the start of the operation, the start signal is supplied to the AND gate 82. The buffer underrunning detection unit of FIG. 14 can accurately detect whether the data processing apparatus is in the buffer underrunning condition during the encoding process.

Therefore, in the present embodiment, it is possible to easily detect the occurrence of the buffer underrunning condition by using a simple circuit such as that of FIG. 14.

Further, in the data processing apparatus of the present embodiment, when it is detected that the buffer underrunning condition takes place, the interface unit 39 stores a predetermined data (in the present embodiment, the value "0") in the page area of the buffer memory 17.

Figure 15:
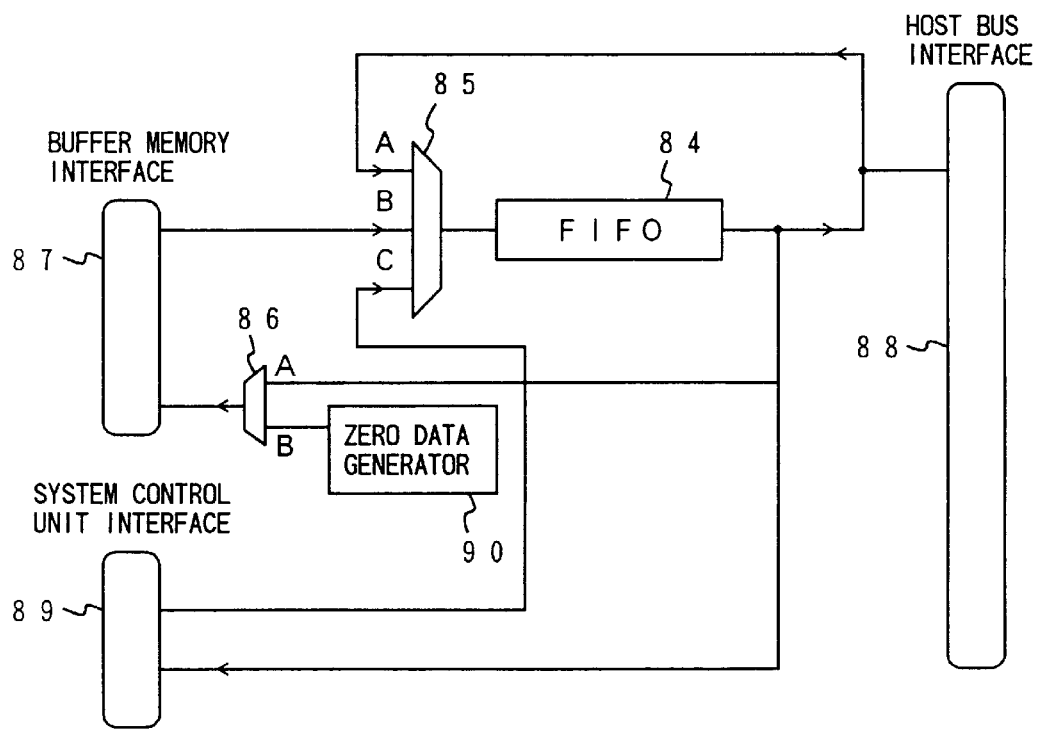
FIG. 15 is a circuit diagram of an example of the interface unit in the data processing apparatus of the second embodiment.

FIG. 15 shows an example of the interface unit in the data processing apparatus of the second embodiment which is used to perform the data transfer between the buffer memory 17, the host computer 19 and the data processing apparatus.

As shown in FIG. 15, the interface unit 39 of the present embodiment comprises an FIFO unit 84 which performs a first-in, first-out (FIFO) buffer function for the data supplied from and to the buffer memory 17, the data supplied from and to the system control unit 31, and the data supplied from and to the host computer 19. A first multiplexer 85 has three inputs A, B and C and selects one of data signals at the inputs A, B and C to be input to the FIFO unit 84. A second multiplexer 86 has two inputs A and B and selects one of the data signals at the inputs A and B to be input to the buffer memory 17. A buffer memory interface 87 receives data from and supplies data to the buffer memory 17. A host bus interface 88 receives data from and supplies data to the host computer 19. A system control unit interface 89 receives data from and supplies data to the system control unit 31.

As shown in FIG. 15, the input A of the multiplexer 85 is connected to the host bus interface 88, the input B of the multiplexer 85 is connected to the buffer memory interface 87, and the input C of the multiplexer 85 is connected to the system control unit interface 89. The output of the multiplexer 85 is connected to the input of the FIFO unit 84. The output of the FIFO unit 84 is connected to the host bus interface 88, the input A of the multiplexer 86 and the system control unit interface 89. The output of the multiplexer 86 is connected to the buffer memory interface 87.

Further, the interface unit 39 comprises a zero data generator 90 which outputs the zero data "0" to the page area of the buffer memory 17 through the multiplexer 86. The output of the zero data generator 90 is connected to the input B of the multiplexer 86.

Further, the system control unit 31 outputs a control signal to the multiplexer 85, and one of the data signals at the inputs A, B and C of the first multiplexer 85 is selected to be input to the FIFO unit 84 in accordance with the control signal. Similarly, the system control unit 31 outputs a control signal to the multiplexer 86 based on the output signal of the buffer underrunning detection unit of FIG. 14, and one of the data signals at the inputs A and B of the multiplexer 86 is selected to be input to the buffer memory 17 in accordance with the control signal.

In the interface unit 39 of FIG. 15, in order to carry out the data transfer between the buffer memory 17, the host computer 19 and the data processing apparatus, the switching operations of the multiplexers 85 and 86 with respect to the input and the output of the FIFO unit 84 are performed in the following manner:

(1) Data from the host computer 19 is transferred to the interface unit 39 and written to the buffer memory 17

When it is detected that the buffer underrunning condition does not take place, the data signal at the input A of the multiplexer 85 is selected and the data signal at the input A of the multiplexer 86 is selected. A number of bits of data from the host computer 19 is supplied to the FIFO unit 84 through the host bus interface 88, and the data is stored by the FIFO unit 84. The data stored by the FIFO unit 84 is supplied to the multiplexer 86, and it is supplied to the buffer memory 17 through the buffer memory interface 87.

When it is detected that the buffer underrunning condition takes place, the data signal at the input B of the multiplexer 86 is selected. The zero data output by the zero data generator 90 is supplied to the buffer memory 17 through the buffer memory interface 87, and the zero data is written to the buffer memory 17. At this time, the data signal from the FIFO unit 84 is not supplied to the buffer memory 17, although the data signal at the input A of the multiplexer 85 is selected.

(2) Data from the buffer memory 17 is read out by the interface unit 39 and transferred to the host computer 19

In this case, the data signal at the input B of the multiplexer 85 is selected. A number of bits of data from the buffer memory 17 is supplied to the FIFO unit 84 through the buffer memory interface 87, and the data is stored by the FIFO unit 84. The data stored by the FIFO unit 84 is supplied to the host computer 19 through the host bus interface 88.

(3) Data from the system control unit 31 is sent to the interface unit 39 and written to the buffer memory 17

In this case, the data signal at the input C of the multiplexer 85 is selected and the data signal at the input A of the multiplexer 86 is selected. A number of bits of data from the system control unit 31 is supplied to the FIFO unit 84 through the system control unit interface 89, and the data is stored by the FIFO unit 84. The data stored by the FIFO unit 84 is supplied to the multiplexer 86, and it is supplied to the buffer memory 17 through the buffer memory interface 87.

For example, when it is desired to write the value "0" indicating the link data or the like, to the buffer memory 17, the data signal at the input B of the multiplexer 86 is selected by the system control unit 31. The zero data from the zero data generator 90 is written to the buffer memory 17.

(4) Data from the buffer memory 17 is read out by the interface unit 39 and sent to the system control unit 31

In this case, the data signal at the input B of the multiplexer 85 is selected. A number of bits of data from the buffer memory 17 is supplied to the FIFO unit 84 through the buffer memory interface 87, and the data is stored by the FIFO unit 84. The data stored by the FIFO unit 84 is supplied to the system control unit 31 through the system control unit interface 89. For example, the data transfer operation in this case is performed when a control message or a command, stored in the buffer memory 17, is read out by the system control unit 31.

(5) Data from the host computer 19 is sent to the interface unit 39 and sent to the system control unit 31

In this case, the data signal at the input A of the multiplexer 85 is selected. A number of bits of data from the host computer 19 is supplied to the FIFO unit 84 through the host bus interface 88, and the data is stored by the FIFO unit 84. The data stored by the FIFO unit 84 is supplied to the system control unit 31 through the system control unit interface 89.

(6) Data from the system control unit 31 is sent to the interface unit 39 and sent to the host computer 19

In this case, the data signal at the input C of the multiplexer 85 is selected. A number of bits of data from the system control unit 31 is supplied to the FIFO unit 84 through the system control unit interface 89, and the data is stored by the FIFO unit 84. The data stored by the FIFO unit 84 is supplied to the host computer 19 through the host bus interface 88.

As described above, in the data processing apparatus of the present embodiment, it is possible to carry out the data transfer between the buffer memory 17, the host computer 19 and the data processing apparatus by performing the switching operations of the multiplexers 85 and 86 with respect to the input and the output of the FIFO unit 84 in an appropriate manner. Further, when it is detected that the buffer underrunning condition takes place, the data signal at the input B of the multiplexer 86 is selected, and it is possible that the zero data be written to the buffer memory 17.

Accordingly, since the data processing apparatus of the present embodiment comprises the interface unit 39 having the FIFO unit 84 and the multiplexer 86, it is possible to safely continue to perform the encoding process without interruption even when the buffer underrunning condition occurs. By using a simple circuit such as that of FIG. 15, the interface unit 39 of the present embodiment can be constructed. Further, it is possible for the data processing apparatus of the present embodiment to efficiently process data of the compact digital disk and provide an increased data processing speed.

Figure 16:
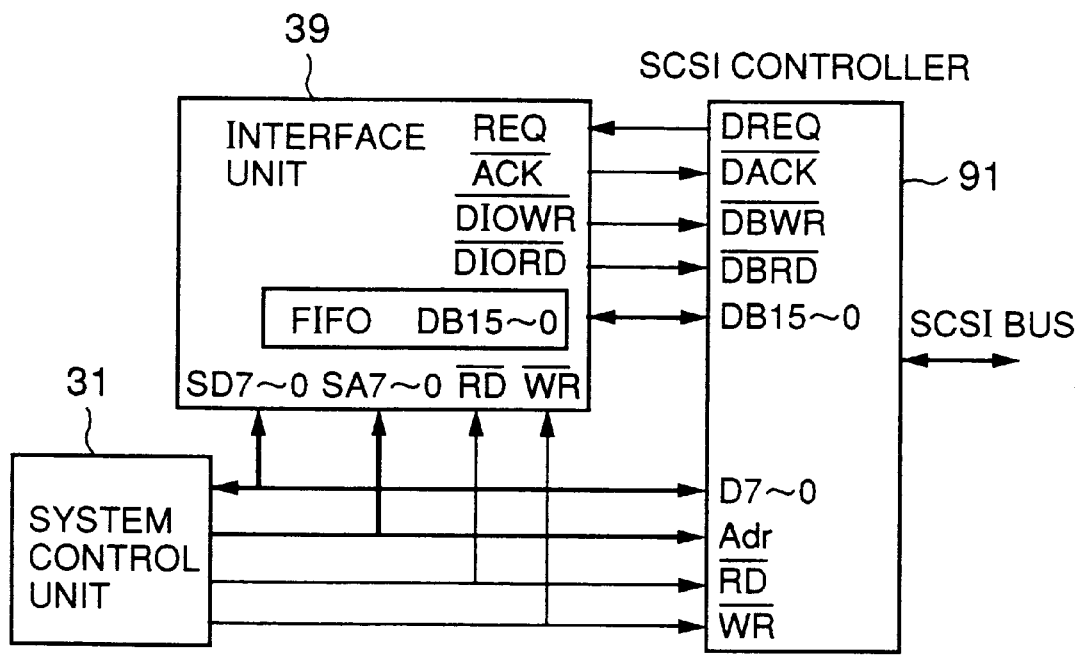
FIG. 16 is a diagram for explaining the internal structure of an interface unit which utilizes the SCSI interface.
Figure 17:
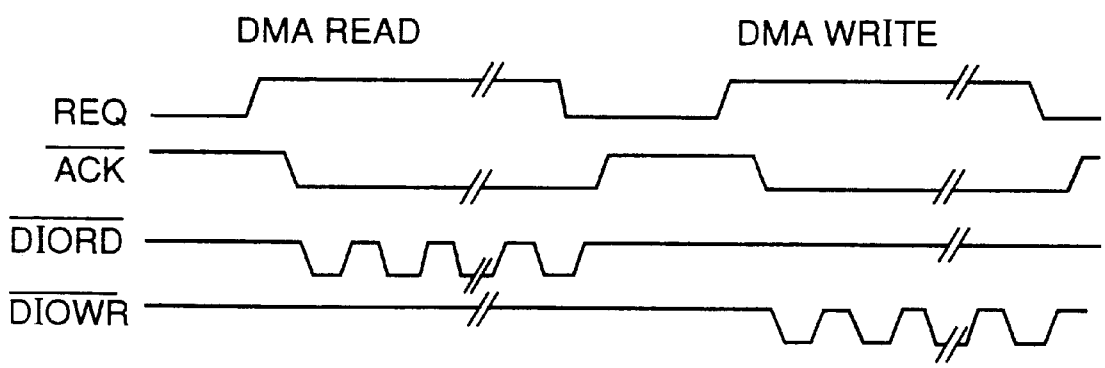
FIG. 17 is a timing chart for explaining control signals of the interface unit which utilizes the SCSI interface.

Next, FIG. 16 shows the internal structure of an interface unit 39 which utilizes the SCSI interface. FIG. 17 is a timing chart for explaining control signals of the interface unit which utilizes the SCSI interface.

As shown in FIG. 16, the interface unit 39 and the system control unit 31 are connected to a SCSI controller 91 via various signal lines. The SCSI controller 91 is connected to the host computer 19 via a SCSI bus, and receives data from and supplies data to the host computer 19 through the SCSI bus. The interface unit 39 comprises the FIFO unit 84 and a DMA (direct memory access) controller (not shown). The data transfer between the FIFO unit 84 of the interface unit 39 and the SCSI controller 91 is controlled by the DMA controller.

As shown in FIG. 17, when the data transfer is started, the interface unit 39 receives an active-high request signal "DREQ" from the SCSI controller 91. This signal is supplied to request the interface unit 39 to start the data transfer. In response to this signal, the DMA controller of the interface unit 39 prepares data to be supplied to the SCSI controller 91, and supplies an active-low acknowledgement signal "/ACK" and an active-low strobe signal "/DIORD" (or an active-low IO strobe signal "/DIOWR") to the SCSI controller 91. The data transfer between the FIFO unit 84 and the SCSI controller 91 is carried out by performing a DMA reading operation (or a DMA writing operation) in accordance with the signal "/DIORD" (or the signal "/DIOWR"). The timing of the data transfer is controlled by the DMA controller of the interface unit 39. The interface unit 39 of this embodiment has the master function to control the timing of the data transfer by itself.

Alternatively, an IEEE-1394 controller which is in conformity with the IEEE-1394 interface may be used instead of the SCSI controller 91.

Figure 18:
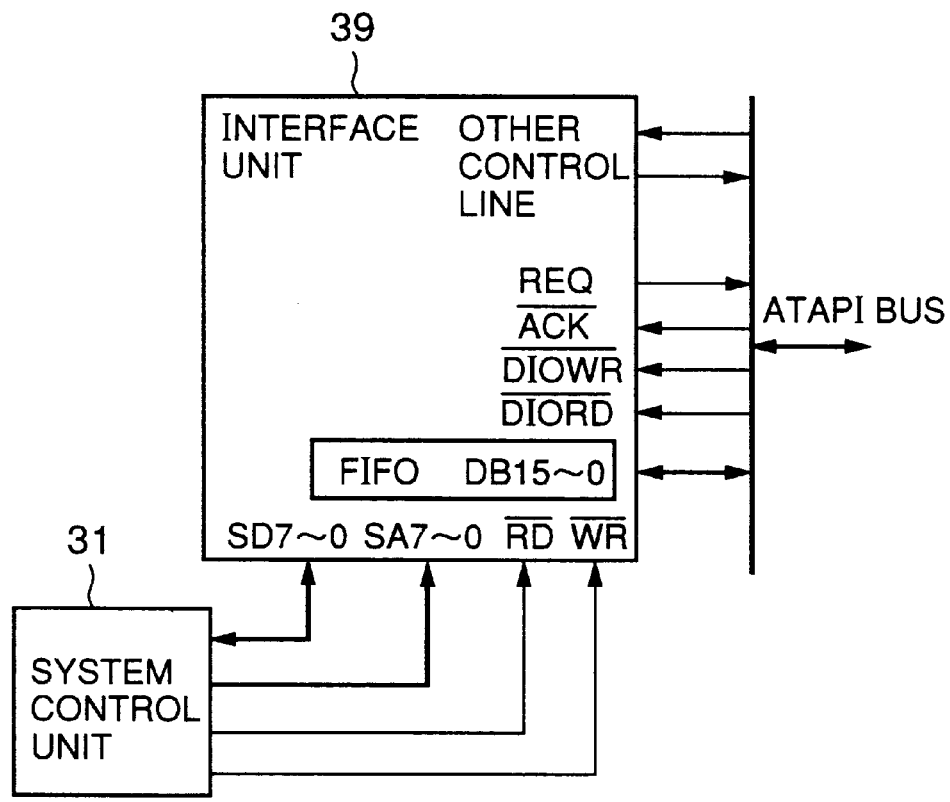
FIG. 18 is a diagram for explaining the internal structure of an interface unit which utilizes the ATAPI interface.
Figure 19:
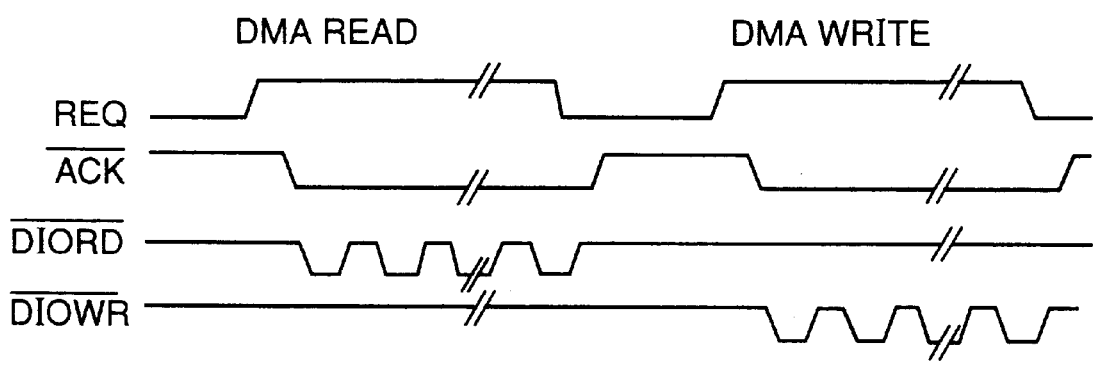
FIG. 19 is a timing chart for explaining control signals of the interface unit which utilizes the ATAPI interface.

FIG. 18 shows the internal structure of an interface unit 39 which utilizes the ATAPI interface. FIG. 19 is a timing chart for explaining control signals of the interface unit which utilizes the ATAPI interface.

As shown in FIG. 18, the interface unit 39 is connected to an ATAPI bus, and the interface unit 39 and the system control unit 31 are interconnected by various signal lines. The interface unit 39 comprises the FIFO unit 84 and a DMA controller (not shown). The data transfer between the FIFO unit 84 of the interface unit 39 and the ATAPI bus is controlled by the DMA controller.

As shown in FIG. 19, when the data transfer is started, the ATAPI bus receives an active-high request signal "REQ" from the interface unit 39. In response to this signal, the ATAPI bus supplies an active-low acknowledgement signal "/ACK" and an active-low IO strobe signal "/DIORD" (or an active-low IO strobe signal "/DIOWR") to the interface unit 39. The data transfer between the FIFO unit 84 and the ATAPI bus is carried out by performing a DMA reading operation (or a DMA writing operation) in accordance with the signal "/DIORD" (or the signal "/DIOWR"). The timing of the data transfer by the DMA controller of the interface unit 39 is controlled by the ATAPI bus. The interface unit 39 of this embodiment has the slave function to control the timing of the data transfer by the signal externally supplied from the ATAPI bus.

Further, the present invention is not limited to the above-described embodiments, and variations and modifications may be made without departing from the scope of the present invention.

What is claimed is:

1. A data processing apparatus of a compact digital disk drive in which digital data is read from or written to a compact digital disk on a sector-unit basis, each sector including user data and a subcode, supplied by a host computer when encoding and supplied by a compact digital disk when decoding, the digital data being temporarily stored, said data processing apparatus comprising:

a buffer memory having a page area divided into a plurality of a pages, each of said plurality of pages having a predetermined size and containing main data, a subcode and an error code within the page, each said page corresponding to one sector of digital data produced by the compact digital disk drive with respect to the compact digital disk, an address of each said page of the buffer memory being specified by a page number;

a buffer management unit for accessing data of a particular page of the buffer memory including the main data, the sub code and the error code via a same data path, in response to an input address, the input address specifying a starting address of the data of the particular page of the buffer memory;

an interface unit for storing the user data and the subcode of the digital data in a user data field and a subcode field of a particular page of the buffer memory, the interface unit having a page register which holds a page number specifying an address of the particular page of the buffer memory;

a subcode processing unit for processing the subcode stored in the subcode field of the particular page of the buffer memory to produce processed data, and for outputting the processed data to the encoding unit, the subcode processing unit having a page register which holds a page number which is the same as the page number held by the page register of the interface unit; and a system control unit, having a page register, for generating the input address by combining a page number stored by the page register with a predetermined offset, and for supplying the input address to the buffer management unit when the data of the buffer memory is accessed, the offset being determined in accordance with the data to be accessed, the page number specifying a starting address of the particular page of the buffer memory, the offset specifying a location of the data to be accessed in the particular page relative to the starting address, wherein higher order bits of the input address are determined by the page number and lower order bits of the input address are determined by the predetermined offset.

2. The data processing apparatus according to claim 1, wherein the data processing apparatus receives one sector of digital data, including a main data and a subcode, said digital data produced by a decoding unit of the compact digital disk drive with respect to the compact digital disk, and transfers processed data to a host computer, said data processing apparatus further comprising:

a CD-DA processing unit for storing the main data of one sector of the digital data output by the decoding unit, into a main data field of a particular page of the buffer memory, the CD-DA processing unit having a page register which holds a page number specifying an address of the particular page of the buffer memory;

a subcode processing unit for storing the subcode of one sector of the digital data output from the decoding unit, into a subcode field of the particular page of the buffer memory, the subcode processing unit having a page register which holds a page number specifying the address of the particular page of the buffer memory;

a sector processing unit for performing an error correction of the main data after the main data is stored in the buffer memory by the CD-DA processing unit, and for storing processed data, including user data and error codes, in various fields of the particular page of the buffer memory, the sector processing unit having a page register specifying the address of the particular page of the buffer memory; and an interface unit for transferring the stored data of the particular page to the host computer after the processing of one sector by the sector processing unit with respect to the digital data output by the decoding unit is completed, the interface unit having an area designation register which is used to perform an area designation of the stored data of the buffer memory being transferred to the host computer.

3. The data processing apparatus according to claim 1, wherein the data processing apparatus receives one sector of digital data and transfers processed data to an encoding unit of the compact digital disk drive so that a coded information sequence from the encoding unit is written to the compact digital disk, the data processing apparatus further comprising:

a sector processing unit for generating a header, a subheader, an error detection code and an error correction code with respect to the user data stored in the user data field of the particular page of the buffer memory, and for storing the header, the subheader, the error detection code and the error correction code, in corresponding fields of the particular page of the buffer memory to form a main data stored in a main data field of the particular page, the sector processing unit having a page register which holds a page number which is the same as the page number held by the page register of the interface unit; and a CD-DA processing unit for outputting the main data, stored in the main data field of the particular page of the buffer memory, to the encoding unit, the CD-DA processing unit having a page register which holds a page number which is the same as the page number held by the page register of the sector processing unit.

4. The data processing apparatus according to claim 1, further comprising an interface unit for transferring stored data of a particular page of the buffer memory to a host computer, the interface unit having an area designation register having bits used to designate a particular area of the stored data of the buffer memory being transferred to the host computer.

5. The data processing apparatus according to claim 4, wherein said interface unit further comprises a plurality of working registers, each of said plurality of working registers having a starting address register which contains bits indicating a starting address of an arbitrary area of the buffer memory in which stored data is to be transferred, and said each working register having a length register which contains bits indicating a length of the arbitrary area of the buffer memory.

6. The data processing apparatus according to claim 3, wherein said interface unit comprises:

a data supplying unit for outputting the data supplied by the host computer;

a predetermined data supplying unit for outputting a predetermined data;

a detection unit for detecting occurrence of a buffer underrunning condition of the data processing apparatus, based on the page number held by the page register of the CD-DA processing unit and the page number held by the page register of the interface unit; and a switching unit for outputting the predetermined data, output by the predetermined data supplying unit, to the buffer memory when it is detected by the detection unit that the buffer underrunning condition occurs, and for outputting the data, output by the data supplying unit, to the buffer memory when the detection unit determines an absence of the buffer underrunning condition.

7. The data processing apparatus according to claim 6, wherein said detection unit comprises a comparator which compares the page number held by the page register of the CD-DA processing unit with the page number held by the page register of the interface unit, and outputs an ON signal when the page number held by the page register of the CD-DA processing unit and incremented by 1 is equal to or greater than the page number held by the page register of the interface unit.

8. The data processing apparatus according to claim 6, wherein said data supplying unit is a first-in first-out unit which performs a first-in first-out buffer function for data being supplied from and to the host computer, said first-in first-out unit holding the data supplied from the host computer, the data held by said first-in first-out unit being supplied to the buffer memory in the absence of the buffer underrunning condition.

9. The data processing apparatus according to claim 6, wherein said detection unit comprises a comparator and an AND gate, the AND gate having an input connected to an output of the comparator, and an input for receiving a start signal, the AND gate outputting a detection signal to the detection unit based on a signal at the output of the comparator and based on the start signal.

10. The data processing apparatus according to claim 6, wherein said predetermined data supplying unit outputs zero data to the buffer memory so that the zero data is written to the buffer memory when the buffer underrunning condition is detected.

11. A data processing method for processing data for a compact digital disk drive in which digital data is read from or written to a compact digital disk on a sector-unit basis, each sector including user data and a subcode, supplied by a host computer when encoding and supplied by a compact digital disk when decoding, the digital data being temporarily stored, said data processing method comprising:

dividing a buffer memory having a page area into a plurality of a pages, each of said plurality of pages having a predetermined size and containing main data, a subcode and an error code within the page, each said page corresponding to one sector of digital data produced by the compact digital disk drive with respect to the compact digital disk, an address of each said page of the buffer memory being specified by a page number;

accessing data of a particular page of the buffer memory including the main data, the sub code and the error code via a same data path, in response to an input address, the input address specifying a starting address of the data of the particular page of the buffer memory;

storing the user data and the subcode of the digital data in a user data field and a subcode field of a particular page of the buffer memory, wherein a page register holds a page number specifying an address of the particular page of the buffer memory;

processing the subcode stored in the subcode field of the particular page of the buffer memory to produce processed data, and for outputting the processed data to an encoding step wherein a second page register holds a page number which is the same as the page number held by the page register used in the storing step: and generating the input address by combining a page number stored by a page register with a predetermined offset, and for supplying the input address for use by the accessing step when the data of the buffer memory is accessed, the offset being determined in accordance with the data to be accessed, the page number specifying a starting address of the particular page of the buffer memory, the offset specifying a location of the data to be accessed in the particular page relative to the starting address, wherein higher order bits of the input address are determined by the page number and lower order bits of the input address are determined by the predetermined offset.

12. A data processing apparatus of a compact digital disk drive in which digital data is read from or written to a compact digital disk on a sector-unit basis, each sector including user data and a subcode, supplied by a host computer when encoding and supplied by a compact disk when decoding, the digital data being temporarily stored, said data processing apparatus comprising:

a buffer memory having a page area divided into a plurality of a pages, each of said plurality of pages having a predetermined size and containing main data, a subcode and an error code within the page, each said page corresponding to one sector of digital data produced by the compact digital disk drive with respect to the compact digital disk, an address of each said page of the buffer memory being specified by a page number;

a buffer management unit for accessing data of a particular page of the buffer memory including the main data, the sub code and the error code via a same data path, in response to an input address, the input address specifying a starting address of the data of the particular page of the buffer memory;

a sector processing unit for generating a header, a subheader, an error detection code and an error correction code with respect to the user data stored in the user data field of the particular page of the buffer memory, and for storing the header, the subheader, the error detection code and the error correction code, in corresponding fields of the particular page of the buffer memory to form a main data stored in a main data field of the particular page, the sector processing unit having a page register which holds a page number which is the same as the page number held by a page register of an interface unit;

a CD-DA processing unit for outputting the main data, stored in the main data field of the particular page of the buffer memory, to the encoding unit, the CD-DA processing unit having a page register which holds a page number which is the same as the page number held by the page register of the sector processing unit; and a system control unit, having a page register, for generating the input address by combining a page number stored by the page register of the system control unit with a predetermined offset, and for supplying the input address to the buffer management unit when the data of the buffer memory is accessed, the offset being determined in accordance with the data to be accessed, the page number specifying a starting address of the particular page of the buffer memory, the offset specifying a location of the data to be accessed in the particular page relative to the starting address, wherein higher order bits of the input address are determined by the page number and lower order bits of the input address are determined by the predetermined offset.

13. The data processing apparatus according to claim 12, wherein the data processing apparatus receives one sector of digital data and transfers processed data to an encoding unit of the compact digital disk drive so that a coded information sequence from the encoding unit is written to the compact digital disk, the data processing apparatus further comprising:

an interface unit for storing the user data and the subcode of the digital data in a user data field and a subcode field of a particular page of the buffer memory, the interface unit having a page register which holds a page number specifying an address of the particular page of the buffer memory; and a subcode processing unit for processing the subcode stored in the subcode field of the particular page of the buffer memory to produce processed data, and for outputting the processed data to the encoding unit, the subcode processing unit having a page register which holds a page number which is the same as the page number held by the page register of the interface unit.

14. A data processing method for processing data for a compact digital disk drive in which digital data is read from or written to a compact digital disk on a sector-unit basis, each sector including user data and a subcode, supplied by a host computer when encoding and supplied by a compact digital disk when decoding, the digital data being temporarily stored, said data processing method comprising:

dividing a buffer memory having a page area into a plurality of a pages, each of said plurality of pages having a predetermined size and containing main data, a subcode and an error code within the page, each said page corresponding to one sector of digital data produced by the compact digital disk drive with respect to the compact digital disk, an address of each said page of the buffer memory being specified by a page number;

accessing data of a particular page of the buffer memory including the main data, the sub code and the error code via a same data path, in response to an input address, the input address specifying a starting address of the data of the particular page of the buffer memory;

generating a header, a subheader, an error detection code and an error correction code with respect to the user data stored in the user data field of the particular page of the buffer memory, and storing the header, the subheader, the error detection code and the error correction code, in corresponding fields of the particular page of the buffer memory to form a main data stored in a main data field of the particular page, wherein a second page register holds a page number which is the same as the page number held by a page register of an interface unit; and outputting the main data, stored in the main data field of the particular page of the buffer memory, to an encoding unit, wherein a third page register holds a page number which is the same as the page number held by the second page register; and generating the input address by combining a page number stored by a page register with a predetermined offset, and for supplying the input address for use by the accessing step when the data of the buffer memory is accessed, the offset being determined in accordance with the data to be accessed, the page number specifying a starting address of the particular page of the buffer memory, the offset specifying a location of the data to be accessed in the particular page relative to the starting address, wherein higher order bits of the input address are determined by the page number and lower order bits of the input address are determined by the predetermined offset.

* * * * *